US012796705B2

(12) United States Patent
Eklof et al.

(10) Patent No.: US 12,796,705 B2
(45) Date of Patent: Nov. 17, 2026

(54) PROCESS FOR PREPARING A PLANT-BASED FERMENTED DAIRY ALTERNATIVE

(71) Applicant: Novozymes A/S, Bagsvaerd (DK)

(72) Inventors: Jens Magnus Eklof, Frederiksberg (DK); Lykke Christina Stounbjerg, Soeborg (DK); Xiaowei Qi, Hellerup (DK)

(73) Assignee: Novozymes A/S, Bagsvaerd (DK)

( * ) Notice: Subject to any disclaimer, the term of this patent is extended or adjusted under 35 U.S.C. 154(b) by 377 days.

(21) Appl. No.: 18/259,428

(22) PCT Filed: Nov. 11, 2021

(86) PCT No.: PCT/EP2021/081398
§ 371 (c)(1),
(2) Date: Jun. 27, 2023

(87) PCT Pub. No.: WO2022/148567
PCT Pub. Date: Jul. 14, 2022

(65) Prior Publication Data

US 2024/0057627 A1 Feb. 22, 2024

(30) Foreign Application Priority Data

Jan. 5, 2021 (EP) .................................... 21150341

(51) Int. Cl.
*A23C 11/10* (2025.01)
*A23L 11/50* (2021.01)

(52) U.S. Cl.
CPC ............. *A23C 11/106* (2013.01); *A23L 11/50* (2021.01); *A23C 2220/10* (2013.01); *C12Y 301/01032* (2013.01); *C12Y 304/21004* (2013.01); *C12Y 304/21019* (2013.01); *C12Y 304/2105* (2013.01)

(58) Field of Classification Search
CPC .............. A23C 11/106; A23C 2220/10; A23C 11/103; A23L 11/50; A23L 7/104; A23L 25/40; A23L 11/00; A23L 7/10; A23L 7/107; A23L 11/40; A23L 11/60; C12Y 301/01032; C12Y 304/21004; C12Y 304/21019; C12Y 304/2105
See application file for complete search history.

(56) References Cited

U.S. PATENT DOCUMENTS

| | | | |
|---|---|---|---|
| 2008/0305212 A1 | 12/2008 | Wong et al. | |
| 2009/0035820 A1 | 2/2009 | Klotz et al. | |
| 2011/0250313 A1 | 10/2011 | Hwang et al. | |

FOREIGN PATENT DOCUMENTS

| | | | | |
|---|---|---|---|---|
| CN | 109699748 A | 5/2019 | | |
| EP | 0244152 A2 | 11/1987 | | |
| JP | 8066161 A | 3/1996 | | |
| JP | 2010081858 A | 4/2010 | | |
| JP | 2015050993 A | 3/2015 | | |
| KR | 100214224 B1 | 8/1999 | | |
| KR | 20010091737 A | 10/2001 | | |
| WO | 2008125685 A2 | 10/2008 | | |
| WO | 2010/033985 A1 | 3/2010 | | |
| WO | WO-2010078461 A1 * | 7/2010 | .............. | A61P 43/00 |
| WO | WO-2014110540 A1 * | 7/2014 | ........... | A23L 29/238 |
| WO | 2018/049853 A1 | 3/2018 | | |
| WO | 2019/138121 A1 | 7/2019 | | |
| WO | WO-2020157209 A1 * | 8/2020 | ........... | A23C 11/106 |

OTHER PUBLICATIONS

SweoatTM Flours P12. 2015. Downloaded on Jul. 23, 2025, from URL: <https://static1.squarespace.com/static/52a872fbe4b07c0cc2e85bdc/t/54b6408be4b0567044a7fdab/1421230219951/Flours+2015-01-14.pdf>. (Year: 2015).*
GoDairyFree Ripple Yogurt Alternative. Sep. 14, 2019. Downloaded on Jul. 23, 2025, from URL: https://godairyfree.org/product-reviews/ripple-yogurt-dairy-free (Year: 2019).*
Uniprot P15636—API_ACHLY (Obtained from URL: https://www.uniprot.org/uniprotkb/P15636/entry>, first database entry on Apr. 1990. Downloaded on Jul. 23, 2025. (Year: 1990).*
Lilbaek et al. J. Agric. Food Chem. 2007, 55, 2970-2978. (Year: 2007).*
Anonymous, 2016, Brenda—Information on EC 3.4.22.2—papain.
Anonymous, 2021, Mucorpepsin Wikipedia.
Park et al., 2015, J. Korean Soc. Appl. Biol. Chem., vol. 58, No. 5, pp. 761-769.

* cited by examiner

*Primary Examiner* — Erik Kashnikow
*Assistant Examiner* — Janice Y Silverman
(74) *Attorney, Agent, or Firm* — Yoshimi D. Barron

(57) ABSTRACT

The present invention relates to preparation of a plant-based fermented dairy alternative where the plant-based substrate is treated with an endopeptidase, preferably a specific endopeptidase selected from trypsin-like endopeptidase, lysine-specific endopeptidase or glutamyl-specific endo-peptidase. Further preferred is the combination with a phospholipase.

15 Claims, 4 Drawing Sheets

Specification includes a Sequence Listing.

SEQUENCE LISTING

```
<160> NUMBER OF SEQ ID NOS: 15

<210> SEQ ID NO 1
<211> LENGTH: 224
<212> TYPE: PRT
<213> ORGANISM: Fusarium oxysporum

<400> SEQUENCE: 1

Ile Val Gly Gly Thr Ser Ala Ser Ala Gly Asp Phe Pro Phe Ile Val
1               5                   10                  15

Ser Ile Ser Arg Asn Gly Gly Pro Trp Cys Gly Gly Ser Leu Leu Asn
            20                  25                  30

Ala Asn Thr Val Leu Thr Ala Ala His Cys Val Ser Gly Tyr Ala Gln
        35                  40                  45

Ser Gly Phe Gln Ile Arg Ala Gly Ser Leu Ser Arg Thr Ser Gly Gly
    50                  55                  60

Ile Thr Ser Ser Leu Ser Ser Val Arg Val His Pro Ser Tyr Ser Gly
65                  70                  75                  80

Asn Asn Asn Asp Leu Ala Ile Leu Lys Leu Ser Thr Ser Ile Pro Ser
                85                  90                  95

Gly Gly Asn Ile Gly Tyr Ala Arg Leu Ala Ala Ser Gly Ser Asp Pro
            100                 105                 110

Val Ala Gly Ser Ser Ala Thr Val Ala Gly Trp Gly Ala Thr Ser Glu
        115                 120                 125

Gly Gly Ser Ser Thr Pro Val Asn Leu Leu Lys Val Thr Val Pro Ile
    130                 135                 140

Val Ser Arg Ala Thr Cys Arg Ala Gln Tyr Gly Thr Ser Ala Ile Thr
145                 150                 155                 160

Asn Gln Met Phe Cys Ala Gly Val Ser Ser Gly Gly Lys Asp Ser Cys
                165                 170                 175

Gln Gly Asp Ser Gly Gly Pro Ile Val Asp Ser Ser Asn Thr Leu Ile
            180                 185                 190

Gly Ala Val Ser Trp Gly Asn Gly Cys Ala Arg Pro Asn Tyr Ser Gly
        195                 200                 205
```

```
Val Tyr Ala Ser Val Gly Ala Leu Arg Ser Phe Ile Asp Thr Tyr Ala
    210                 215                 220
```

<210> SEQ ID NO 2
<211> LENGTH: 226
<212> TYPE: PRT
<213> ORGANISM: Fusarium sp.

<400> SEQUENCE: 2

```
Ile Val Gly Gly Thr Ala Ala Ser Ala Gly Asp Phe Pro Phe Ile Val
1               5                   10                  15

Ser Ile Ala Tyr Asn Gly Gly Pro Trp Cys Gly Gly Thr Leu Leu Asn
            20                  25                  30

Ala Ser Thr Val Leu Thr Ala Ala His Cys Thr Gln Gly Arg Ser Ala
        35                  40                  45

Ser Ala Phe Gln Val Arg Ala Gly Ser Leu Asn Arg Asn Ser Gly Gly
    50                  55                  60

Val Thr Ser Ala Val Ser Ser Ile Arg Ile His Pro Ser Phe Ser Gly
65                  70                  75                  80

Ser Thr Leu Asn Asn Asp Val Ser Ile Leu Lys Leu Ser Thr Pro Ile
                85                  90                  95

Ser Thr Ser Ser Thr Ile Ser Tyr Gly Arg Leu Ala Ala Ser Gly Ser
            100                 105                 110

Asp Pro Ala Ala Gly Ser Asp Ala Thr Val Ala Gly Trp Gly Val Thr
        115                 120                 125

Ser Gln Gly Ser Ser Ser Ser Pro Val Ala Leu Arg Lys Val Thr Ile
    130                 135                 140

Pro Ile Val Ser Arg Thr Thr Cys Arg Ser Gln Tyr Gly Thr Ser Ala
145                 150                 155                 160

Ile Thr Thr Asn Met Phe Cys Ala Gly Leu Ala Glu Gly Gly Lys Asp
                165                 170                 175

Ser Cys Gln Gly Asp Ser Gly Gly Pro Ile Val Asp Thr Ser Asn Thr
            180                 185                 190

Val Ile Gly Ile Val Ser Trp Gly Glu Gly Cys Ala Gln Pro Asn Phe
        195                 200                 205

Ser Gly Val Tyr Ala Arg Val Gly Ser Leu Arg Ser Tyr Ile Asp Gly
    210                 215                 220

Gln Leu
225
```

<210> SEQ ID NO 3
<211> LENGTH: 225
<212> TYPE: PRT
<213> ORGANISM: Kutzneria albida

<400> SEQUENCE: 3

```
Ile Val Gly Gly Thr Lys Ala Ser Thr Ser Thr Tyr Pro Phe Val Val
1               5                   10                  15

Phe Leu Thr Asp Ser Thr Gly Phe Gln Phe Cys Gly Gly Thr Leu Val
            20                  25                  30

Lys Pro Asn Lys Val Val Thr Ala Ala His Cys Thr Val Gly Glu Ser
        35                  40                  45

Ala Ala Asn Ile Arg Val Val Ala Gly Arg Asp Asp Lys Gln Ser Thr
    50                  55                  60

Ala Gly Thr Val Ser Lys Val Ser Lys Ile Trp Ile His Pro Ser Tyr
65                  70                  75                  80
```

```
Gln Asp Ala Thr Lys Gly Ser Asp Val Ser Val Leu Thr Leu Ser Thr
                85                  90                  95

Ser Leu Thr Gln Phe Thr Pro Leu Pro Leu Ala Ala Thr Thr Asp Thr
            100                 105                 110

Ala Leu Tyr Lys Glu Gly Thr Ala Ala Thr Ile Leu Gly Trp Gly Asp
        115                 120                 125

Thr Thr Glu Gly Gly Ser Ala Ser Arg Tyr Leu Leu Lys Ala Thr Val
    130                 135                 140

Pro Leu Thr Ser Asp Ala Thr Cys Lys Lys Ala Tyr Gly Glu Tyr Ser
145                 150                 155                 160

Ser Thr Ala Met Val Cys Ala Gly Tyr Pro Gln Gly Gly Thr Asp Thr
                165                 170                 175

Cys Gln Gly Asp Ser Gly Gly Pro Leu Val Ala Gly Asn Lys Leu Ile
            180                 185                 190

Gly Ile Thr Ser Trp Gly Gln Gly Cys Ala Glu Ala Gly Tyr Pro Gly
        195                 200                 205

Val Tyr Thr Arg Val Ala Thr Tyr Ser Ser Leu Ile Thr Gln Gln Leu
    210                 215                 220

Gly
225


<210> SEQ ID NO 4
<211> LENGTH: 231
<212> TYPE: PRT
<213> ORGANISM: Trichoderma reesei

<400> SEQUENCE: 4

Ile Val Gly Gly Thr Ala Ala Ser Leu Gly Glu Phe Pro Tyr Ile Val
1               5                   10                  15

Ser Leu Gln Asn Pro Asn Gln Gly Gly His Phe Cys Gly Gly Val Leu
            20                  25                  30

Val Asn Ala Asn Thr Val Val Thr Ala Ala His Cys Ser Val Val Tyr
        35                  40                  45

Pro Ala Ser Gln Ile Arg Val Arg Ala Gly Thr Leu Thr Trp Asn Ser
    50                  55                  60

Gly Gly Thr Leu Val Gly Val Ser Gln Ile Ile Val Asn Pro Ser Tyr
65                  70                  75                  80

Asn Asp Arg Thr Thr Asp Phe Asp Val Ala Val Trp His Leu Ser Ser
                85                  90                  95

Pro Ile Arg Glu Ser Ser Thr Ile Gly Tyr Ala Thr Leu Pro Ala Gln
            100                 105                 110

Gly Ser Asp Pro Val Ala Gly Ser Thr Val Thr Thr Ala Gly Trp Gly
        115                 120                 125

Thr Thr Ser Glu Asn Ser Asn Ser Ile Pro Ser Arg Leu Asn Lys Val
    130                 135                 140

Ser Val Pro Val Val Ala Arg Ser Thr Cys Gln Ala Asp Tyr Arg Ser
145                 150                 155                 160

Gln Gly Leu Ser Val Thr Asn Asn Met Phe Cys Ala Gly Leu Thr Gln
                165                 170                 175

Gly Gly Lys Asp Ser Cys Ser Gly Asp Ser Gly Gly Pro Ile Val Asp
            180                 185                 190

Ala Asn Gly Val Leu Gln Gly Val Val Ser Trp Gly Ile Gly Cys Ala
        195                 200                 205

Glu Ala Gly Phe Pro Gly Val Tyr Thr Arg Ile Gly Asn Phe Val Asn
    210                 215                 220
```

```
Tyr Ile Asn Gln Asn Leu Ala
225                 230


<210> SEQ ID NO 5
<211> LENGTH: 224
<212> TYPE: PRT
<213> ORGANISM: Actinosynnema mirum

<400> SEQUENCE: 5

Ile Val Gly Gly Thr Arg Ala Ser Ile Ser Glu Ala Pro Trp Thr Val
1               5                   10                  15

Tyr Leu Ala Ser Ser Ser Gly Ser Gln Phe Cys Gly Gly Thr Leu Val
            20                  25                  30

Lys Ala Asn Lys Val Val Thr Ala Ala His Cys Val Ala Gly Arg Ser
        35                  40                  45

Ala Ser Ser Thr Arg Val Val Ile Gly Arg Glu Asp Lys Gln Ser Thr
    50                  55                  60

Ala Gly Thr Val Ala Thr Val Ser Gly Ile Trp Ser His Pro Ser Tyr
65                  70                  75                  80

Arg Thr Ala Thr Ser Gly Tyr Asp Val Ala Val Leu Thr Leu Gly Thr
                85                  90                  95

Ser Val Ser Gly Thr Tyr Leu Pro Leu Ala Thr Pro Ser Asp Thr Ala
            100                 105                 110

Leu Tyr Ala Ala Gly Thr Asn Ala Val Ala Tyr Gly Trp Gly Ala Thr
        115                 120                 125

Cys Ser Gly Cys Ser Thr Ser Arg Tyr Leu Leu Lys Val Thr Val Pro
    130                 135                 140

Val Thr Ser Asp Ala Thr Cys Lys Thr Ala Tyr Ser Gln Tyr Ser Asn
145                 150                 155                 160

Thr Ser Met Val Cys Ala Gly Val Pro Ala Gly Gly Lys Asp Thr Cys
                165                 170                 175

Gln Gly Asp Ser Gly Gly Pro Leu Val Ala Gly Gly Lys Leu Ile Gly
            180                 185                 190

Ala Thr Ser Trp Gly Asn Gly Cys Ala Leu Pro Asn Tyr Pro Gly Val
        195                 200                 205

Tyr Ala Arg Val Ala Ala Tyr Tyr Ser Val Leu Ser Ala Gln Ile Gly
    210                 215                 220


<210> SEQ ID NO 6
<211> LENGTH: 221
<212> TYPE: PRT
<213> ORGANISM: Kribbella flavida

<400> SEQUENCE: 6

Leu Ala Ala Ala Asn Val Pro Val Tyr Val His Val Met Arg Asp Ala
1               5                   10                  15

Ala Gly Asn Gly Asp Val Thr Asp Ser Gln Ile Ser Gln Gln Ile Ala
            20                  25                  30

Val Leu Asn Asn Thr Phe Ala Gly Gly Glu Ser Thr Ala Ala Ala Asn
        35                  40                  45

Thr Gly Phe Ser Phe Ser Leu Ala Gly Thr Tyr Arg Tyr Asn Asn Thr
    50                  55                  60

Gln Trp His Gln Asp Lys Gln Ser Ser Thr Tyr Arg Lys Gln Thr Arg
65                  70                  75                  80

Lys Gly Gly Ala Asn Ala Leu Asn Ile Trp Leu Val Asp Phe Gly Tyr
                85                  90                  95
```

Leu Gly Ile Ala Thr Phe Pro Trp Asp Tyr Gln Arg Gln Pro Gly Ile
100 105 110

Asp Gly Ile Arg Val Gln Tyr Thr Ser Leu Pro Gly Gly Ser Glu Pro
115 120 125

Asn Tyr Asn Leu Gly Glu Thr Ala Thr His Glu Ala Gly His Trp Phe
130 135 140

Gly Leu Tyr His Thr Phe Gln Gly Gly Cys Thr Thr Thr Asn Asp Glu
145 150 155 160

Val Ala Asp Thr Pro Ala Gln Gly Ser Pro Thr Asn Gly Cys Pro Thr
165 170 175

Gly Arg Asp Ser Cys Ser Leu Pro Gly Leu Asp Pro Ile His Asn Tyr
180 185 190

Met Asp Tyr Ser Tyr Asp Ser Cys Tyr Asn Gln Phe Thr Pro Asp Gln
195 200 205

Ser Thr Arg Ile Ser Thr Met Trp Thr Ala Tyr Arg Ala
210 215 220

<210> SEQ ID NO 7
<211> LENGTH: 226
<212> TYPE: PRT
<213> ORGANISM: Fusarium solani

<400> SEQUENCE: 7

Ile Val Gly Gly Thr Ala Ala Ser Ala Gly Asp Phe Pro Phe Ile Val
1 5 10 15

Ser Ile Ala Tyr Asn Gly Gly Pro Trp Cys Gly Gly Thr Leu Leu Asn
20 25 30

Ala Asn Thr Val Met Thr Ala Ala His Cys Thr Gln Gly Arg Ser Ala
35 40 45

Ser Ala Phe Gln Val Arg Ala Gly Ser Leu Asn Arg Asn Ser Gly Gly
50 55 60

Val Thr Ser Ser Val Ser Ser Ile Arg Ile His Pro Ser Phe Ser Ser
65 70 75 80

Ser Thr Leu Asn Asn Asp Val Ser Ile Leu Lys Leu Ser Thr Pro Ile
85 90 95

Ser Thr Ser Ser Thr Ile Ser Tyr Gly Arg Leu Ala Ala Ser Gly Ser
100 105 110

Asp Pro Val Ala Gly Ser Asp Ala Thr Val Ala Gly Trp Gly Val Thr
115 120 125

Ser Gln Gly Ser Ser Ser Ser Pro Val Ala Leu Arg Lys Val Thr Ile
130 135 140

Pro Ile Val Ser Arg Thr Thr Cys Arg Ser Gln Tyr Gly Thr Ser Ala
145 150 155 160

Ile Thr Thr Asn Met Phe Cys Ala Gly Leu Ala Glu Gly Gly Lys Asp
165 170 175

Ser Cys Gln Gly Asp Ser Gly Gly Pro Ile Val Asp Thr Ser Asn Thr
180 185 190

Val Ile Gly Ile Val Ser Trp Gly Glu Gly Cys Ala Gln Pro Asn Leu
195 200 205

Ser Gly Val Tyr Ala Arg Val Gly Ser Leu Arg Thr Tyr Ile Asp Gly
210 215 220

Gln Leu
225

-continued

<210> SEQ ID NO 8
<211> LENGTH: 227
<212> TYPE: PRT
<213> ORGANISM: Kribbella flavida

<400> SEQUENCE: 8

Ile Val Gly Gly Ser Leu Ala Ser Thr Ala Gln Ala Pro Trp Ala Ile
1 5 10 15

Ala Leu Asn Asn Ser Gln Ser Pro Ser Pro Ser Gly Gln Trp Cys Gly
20 25 30

Ala Thr Leu Val Lys Ala Asn Lys Ile Val Thr Ala Ala His Cys Val
35 40 45

Thr Lys Ala Arg Ser Thr Tyr Thr Ala Ile Gln Gly Arg Asp Ser Leu
50 55 60

Ser Ser Thr Thr Gly Arg Thr Ser Lys Ile Ala Ser Ile Trp Lys Asp
65 70 75 80

Pro Gln Tyr Gly Arg Ala Pro Gly His Asp Val Ala Val Leu Thr Leu
85 90 95

Ala Thr Pro Phe Thr Gly Val Pro Thr Leu Pro Leu Glu Thr Ser Leu
100 105 110

Ala Ala Asp Ala Val Gly Ala Gln Pro Thr Val Tyr Gly Trp Gly Asn
115 120 125

Thr Glu Gly Thr Gly Pro Ala Asp Arg Phe Gln Lys Val Leu Val Pro
130 135 140

Val Leu Gly Asp Ala Tyr Cys Gly Gln Val Tyr Ala Asn Tyr Asp Tyr
145 150 155 160

Val Ala Asn Gly Glu Ile Cys Ala Gly Tyr Lys Glu Gly Gly Lys Asp
165 170 175

Ser Cys Gln Gly Asp Ser Gly Gly Pro Leu Val Leu Asn Gly Arg Leu
180 185 190

Phe Gly Val Val Ser Trp Gly Ile Gly Cys Ala Asp Ala Gly Asn Pro
195 200 205

Gly Val Tyr Ala Glu Val Ala Thr Tyr Ala Ala Ala Leu Thr Ala Gln
210 215 220

Ile Asn Ser
225

<210> SEQ ID NO 9
<211> LENGTH: 472
<212> TYPE: PRT
<213> ORGANISM: Aspergillus niger

<400> SEQUENCE: 9

Gly Val Leu Leu Pro Leu Thr Ser Lys Gly Pro Ser Ala Lys His Thr
1 5 10 15

Lys Lys Tyr Lys Pro Leu Lys Gln Thr Ser Val Asn Ala Thr Ser Leu
20 25 30

Thr Thr Cys Asp Glu Val Ile Thr Pro Ala Cys Val Ala Ala Leu Tyr
35 40 45

Lys Ile Pro His Ala Ser Gly Asn Val Ser Ala Ser Asn Ser Leu Gly
50 55 60

Ile Phe Glu Glu Gly Asp Tyr Tyr Ala Gln Glu Asp Leu Asp Leu Phe
65 70 75 80

Phe Arg Asn Phe Thr Pro Tyr Ile Pro Lys Gly Thr His Pro Lys Pro
85 90 95

```
Ala Phe Ile Asp Gly Ala Ser Ala Pro Val Ser Val Ala Asp Ala Gly
            100                 105                 110

Ala Glu Ser Asp Leu Asp Phe Gln Leu Ala Tyr Pro Ile Val Tyr Pro
        115                 120                 125

Gln Thr Ile Thr Leu Tyr Gln Thr Asp Asp Tyr Asp Tyr Ala Ser Gly
    130                 135                 140

Glu Val Glu Thr Asp Gly Phe Phe Asn Thr Phe Leu Asp Ala Val Asp
145                 150                 155                 160

Gly Ser Tyr Cys Thr Tyr Cys Ala Tyr Gly Glu Cys Gly Asp Ser Pro
                165                 170                 175

Thr Leu Asp Pro Thr Tyr Pro Asp Asn Ser Thr Gly Gly Tyr Lys Gly
            180                 185                 190

Gln Leu Met Cys Gly Val Tyr Lys Pro Thr Asn Val Ile Ser Val Ser
        195                 200                 205

Tyr Gly Gly Gln Glu Ala Asp Leu Pro Ala Tyr Tyr Gln Gln Arg Gln
    210                 215                 220

Cys Asn Glu Phe Leu Lys Leu Gly Leu Gln Gly Ile Ser Ile Leu Phe
225                 230                 235                 240

Ala Ser Gly Asp Asp Gly Val Ala Gly Pro Pro Gly Asp Asp Ser Thr
                245                 250                 255

Asn Gly Cys Leu Gly Asn Gly Thr Ile Phe Ser Pro Ala Phe Pro Asn
            260                 265                 270

Ser Cys Pro Trp Val Thr Asn Val Gly Ala Thr Lys Leu Tyr Pro Gly
        275                 280                 285

Lys Thr Ile Ala Asp Gly Glu Ser Ala Val Val Asp Pro Ala Gly His
    290                 295                 300

Pro Tyr Ser Val Ala Phe Ser Ser Gly Gly Gly Phe Ser Asn Ile Tyr
305                 310                 315                 320

Thr Ile Pro Asp Tyr Gln Ala Glu Ala Val Ala Glu Tyr Phe Lys Lys
                325                 330                 335

His Asn Pro Pro Tyr Pro Tyr Tyr Glu Gly Asn Ala Ser Phe Gly Lys
            340                 345                 350

Asn Gly Gly Val Tyr Asn Arg Leu Gly Arg Gly Tyr Pro Asp Val Ala
        355                 360                 365

Ala Asn Gly Asp Asn Ile Ala Glu Tyr Asn Ala Gly Glu Phe Ile Leu
    370                 375                 380

Glu Gly Gly Thr Ser Ala Ser Thr Pro Ile Phe Ser Ser Val Ile Asn
385                 390                 395                 400

Arg Ile Ile Glu Lys Arg Ile Ala Ala Gly Lys Gly Pro Leu Gly Phe
                405                 410                 415

Leu Asn Pro Val Leu Tyr Arg Asn Ala Trp Ala Leu Asn Asp Ile Thr
            420                 425                 430

Asn Gly Ser Asn Pro Gly Cys Gly Thr Glu Gly Phe Tyr Thr Ala Pro
        435                 440                 445

Gly Trp Asp Pro Val Thr Gly Leu Gly Thr Pro Asn Phe Pro Lys Leu
    450                 455                 460

Leu Asp Val Phe Leu Asn Leu Pro
465                 470
```

<210> SEQ ID NO 10
<211> LENGTH: 437
<212> TYPE: PRT
<213> ORGANISM: Aspergillus oryzae

<400> SEQUENCE: 10

Gly Leu Asn Val Thr Asn Cys Asp Gln Leu Ile Thr Pro Glu Cys Ile
1 5 10 15

Arg Ala Leu Tyr Lys Ile Pro Ser Ala Arg Ala Ala Pro His Pro Asn
20 25 30

Asn Ser Leu Gly Ile Phe Glu Glu Gly Asp Tyr Tyr Ala Gln Glu Asp
35 40 45

Leu Asp Leu Phe Phe Lys Thr Phe Ala Lys Asp Ile Pro Gln Gly Thr
50 55 60

His Pro Ile Pro Ala Phe Ile Asp Gly Ala Glu Ala Pro Val Pro Val
65 70 75 80

Thr Lys Ala Gly Gly Glu Ser Asp Leu Asp Phe Glu Leu Ala Tyr Pro
85 90 95

Ile Val His Pro Gln Ser Ile Thr Leu Tyr Gln Thr Asp Asp Ala Asn
100 105 110

Trp Ala Ser Asn Thr Thr Gly Phe Leu Asn Thr Phe Leu Asp Ala Leu
115 120 125

Asp Gly Ser Tyr Cys Thr Tyr Cys Ala Tyr Gly Glu Cys Gly Asn Asp
130 135 140

Pro Ser Leu Asp Pro Val Tyr Pro Asp Asp Ala Gly Tyr Asp Gly Gln
145 150 155 160

Leu Met Cys Gly Val Phe Lys Pro Thr Asn Val Ile Ser Val Ser Tyr
165 170 175

Gly Glu Gln Glu Asn Asp Leu Pro Ala Asn Tyr Gln Gln Arg Gln Cys
180 185 190

Met Glu Phe Leu Lys Leu Gly Leu Gln Gly Val Ser Val Leu Phe Ala
195 200 205

Ser Gly Asp Asn Gly Val Ala Gly Pro Pro Gly Asp Gly Asn Ser Val
210 215 220

Asn Gly Cys Leu Asn Asn Gly Thr Val Phe Ser Pro Ala Phe Pro Asn
225 230 235 240

Ser Cys Pro Tyr Ile Thr Asn Val Gly Ala Thr Lys Val Tyr Pro Gly
245 250 255

Tyr Thr Val Ser Gln Pro Glu Ser Ala Val Tyr Asp Pro Asp Gly Leu
260 265 270

Tyr Ser Tyr Ala Ser Gly Gly Gly Phe Ser Asn Ile Tyr Pro Ile Pro
275 280 285

Asp Tyr Gln Ala Glu Ala Val Ala Thr Tyr Phe Lys Asp His Asn Pro
290 295 300

Pro Tyr Pro Tyr Tyr Glu Gly Ala Glu Asn Leu Gly Lys Asn Gly Gly
305 310 315 320

Leu Tyr Asn Arg Leu Gly Arg Gly Tyr Pro Asp Val Ala Ala Asn Gly
325 330 335

Asp Asn Ile Ala Val Phe Asn Gly Gly Glu Phe Gly Ser Ser Gly Gly
340 345 350

Thr Ser Ala Ser Thr Pro Ile Phe Ala Ser Ile Ile Asn Arg Ile Ile
355 360 365

Asp Glu Arg Leu Ala Val Gly Lys Gly Pro Val Gly Phe Ile Asn Pro
370 375 380

Val Leu Tyr Lys Asn Pro Ser Val Leu Asn Asp Ile Thr Asn Gly Thr
385 390 395 400

Asn Pro Gly Cys Gly Thr Asp Gly Phe Ser Thr Ala Pro Gly Trp Asp
405 410 415

Pro Ala Thr Gly Leu Gly Thr Pro Asn Tyr Pro Lys Met Leu Lys Leu
420 425 430

Trp Leu Asp Leu Pro
435

<210> SEQ ID NO 11
<211> LENGTH: 182
<212> TYPE: PRT
<213> ORGANISM: Shewanella woodyi

<400> SEQUENCE: 11

Lys Pro Gly Gly Gly Asp Gly Gly Gly Glu Val Asp Gly Val Thr Phe
1 5 10 15

Thr Gly Arg Cys Ser Asn Ser Gln Lys Thr Asp Ile Leu Ala Gly Leu
20 25 30

Asp Ala Ala Lys Gly Met Ser Ala Asp Ala Asn Gln His Leu Asn Gly
35 40 45

Asn Asn Ser Ser Ser Thr Arg Tyr Asn Thr Trp Phe Gly Asn Tyr Ser
50 55 60

Ser Ser Arg Trp Asn Thr Val Ser Asn Asn Phe Ser Lys Ile Asp Ser
65 70 75 80

Ala Leu Asn Asn Glu Pro Leu Thr Ile Asp Cys Ser Cys Lys Lys Arg
85 90 95

Tyr Phe Ala Tyr Val Tyr Pro Thr Gln Pro Tyr Lys Ile Tyr Met Cys
100 105 110

Arg Ala Phe Trp Ser Ala Pro Thr Thr Gly Thr Asp Ser Lys Gly Gly
115 120 125

Thr Ile Ile His Glu Met Ser His Phe Asn Val Val Ala Gly Thr Asp
130 135 140

Asp Ile Val Tyr Gly Gln Ser Gly Ala Lys Ala Leu Ala Ile Ser Asp
145 150 155 160

Pro Ala Gln Ala Ile Gln Asn Ala Asp Ser His Glu Tyr Phe Ala Glu
165 170 175

Asn Thr Pro Asn Leu Asn
180

<210> SEQ ID NO 12
<211> LENGTH: 223
<212> TYPE: PRT
<213> ORGANISM: Porcinus

<400> SEQUENCE: 12

Ile Val Gly Gly Tyr Thr Cys Ala Ala Asn Ser Ile Pro Tyr Gln Val
1 5 10 15

Ser Leu Asn Ser Gly Ser His Phe Cys Gly Gly Ser Leu Ile Asn Ser
20 25 30

Gln Trp Val Val Ser Ala Ala His Cys Tyr Lys Ser Arg Ile Gln Val
35 40 45

Arg Leu Gly Glu His Asn Ile Asp Val Leu Glu Gly Asn Glu Gln Phe
50 55 60

Ile Asn Ala Ala Lys Ile Ile Thr His Pro Asn Phe Asn Gly Asn Thr
65 70 75 80

Leu Asp Asn Asp Ile Met Leu Ile Lys Leu Ser Ser Pro Ala Thr Leu
85 90 95

Asn Ser Arg Val Ala Thr Val Ser Leu Pro Arg Ser Cys Ala Ala Ala
100 105 110

Gly Thr Glu Cys Leu Ile Ser Gly Trp Gly Asn Thr Lys Ser Ser Gly
115 120 125

Ser Ser Tyr Pro Ser Leu Leu Gln Cys Leu Lys Ala Pro Val Leu Ser
130 135 140

Asp Ser Ser Cys Lys Ser Ser Tyr Pro Gly Gln Ile Thr Gly Asn Met
145 150 155 160

Ile Cys Val Gly Phe Leu Glu Gly Gly Lys Asp Ser Cys Gln Gly Asp
165 170 175

Ser Gly Gly Pro Val Val Cys Asn Gly Gln Leu Gln Gly Ile Val Ser
180 185 190

Trp Gly Tyr Gly Cys Ala Gln Lys Asn Lys Pro Gly Val Tyr Thr Lys
195 200 205

Val Cys Asn Tyr Val Asn Trp Ile Gln Gln Thr Ile Ala Ala Asn
210 215 220

<210> SEQ ID NO 13
<211> LENGTH: 275
<212> TYPE: PRT
<213> ORGANISM: Achromobacter lyticus

<400> SEQUENCE: 13

Ser Leu Ala Lys Arg Asp Val Pro Val Cys Asn Ile Asp Val Val Cys
1 5 10 15

Pro Glu Gly Asp Gly Arg Arg Asp Ile Ile Arg Ala Val Gly Ala Tyr
20 25 30

Ser Lys Ser Gly Thr Leu Ala Cys Thr Gly Ser Leu Val Asn Asn Thr
35 40 45

Ala Asn Asp Arg Lys Met Tyr Phe Leu Thr Ala His His Cys Gly Met
50 55 60

Gly Thr Ala Ser Thr Ala Ala Ser Ile Val Val Tyr Trp Asn Tyr Gln
65 70 75 80

Asn Ser Thr Cys Arg Ala Pro Asn Thr Pro Ala Ser Gly Ala Asn Gly
85 90 95

Asp Gly Ser Met Ser Gln Thr Gln Ser Gly Ser Thr Val Lys Ala Thr
100 105 110

Tyr Ala Thr Ser Asp Phe Thr Leu Leu Glu Leu Asn Asn Ala Ala Asn
115 120 125

Pro Ala Phe Asn Leu Phe Trp Ala Gly Trp Asp Arg Arg Asp Gln Asn
130 135 140

Tyr Pro Gly Ala Ile Ala Ile His His Pro Asn Val Ala Glu Lys Arg
145 150 155 160

Ile Ser Asn Ser Thr Ser Pro Thr Ser Phe Val Ala Trp Gly Gly Gly
165 170 175

Ala Gly Thr Thr His Leu Asn Val Gln Trp Gln Pro Ser Gly Gly Val
180 185 190

Thr Glu Pro Gly Ser Ser Gly Ser Pro Ile Tyr Ser Pro Glu Lys Arg
195 200 205

Val Leu Gly Gln Leu His Gly Gly Pro Ser Ser Cys Ser Ala Thr Gly
210 215 220

Thr Asn Arg Ser Asp Gln Tyr Gly Arg Val Phe Thr Ser Trp Thr Gly
225 230 235 240

Gly Gly Ala Ala Ala Ser Arg Leu Ser Asp Trp Leu Asp Pro Ala Ser
245 250 255

```
Thr Gly Ala Gln Phe Ile Asp Gly Leu Asp Ser Gly Gly Gly Thr Pro
            260                 265                 270

Asn Thr Pro
        275


<210> SEQ ID NO 14
<211> LENGTH: 222
<212> TYPE: PRT
<213> ORGANISM: Bacillus licheniformis

<400> SEQUENCE: 14

Ser Val Ile Gly Ser Asp Asp Arg Thr Arg Val Thr Asn Thr Thr Ala
1               5                   10                  15

Tyr Pro Tyr Arg Ala Ile Val His Ile Ser Ser Ser Ile Gly Ser Cys
            20                  25                  30

Thr Gly Trp Met Ile Gly Pro Lys Thr Val Ala Thr Ala Gly His Cys
        35                  40                  45

Ile Tyr Asp Thr Ser Ser Gly Ser Phe Ala Gly Thr Ala Thr Val Ser
    50                  55                  60

Pro Gly Arg Asn Gly Thr Ser Tyr Pro Tyr Gly Ser Val Lys Ser Thr
65                  70                  75                  80

Arg Tyr Phe Ile Pro Ser Gly Trp Arg Ser Gly Asn Thr Asn Tyr Asp
                85                  90                  95

Tyr Gly Ala Ile Glu Leu Ser Glu Pro Ile Gly Asn Thr Val Gly Tyr
            100                 105                 110

Phe Gly Tyr Ser Tyr Thr Thr Ser Ser Leu Val Gly Thr Thr Val Thr
        115                 120                 125

Ile Ser Gly Tyr Pro Gly Asp Lys Thr Ala Gly Thr Gln Trp Gln His
    130                 135                 140

Ser Gly Pro Ile Ala Ile Ser Glu Thr Tyr Lys Leu Gln Tyr Ala Met
145                 150                 155                 160

Asp Thr Tyr Gly Gly Gln Ser Gly Ser Pro Val Phe Glu Gln Ser Ser
                165                 170                 175

Ser Arg Thr Asn Cys Ser Gly Pro Cys Ser Leu Ala Val His Thr Asn
            180                 185                 190

Gly Val Tyr Gly Gly Ser Ser Tyr Asn Arg Gly Thr Arg Ile Thr Lys
        195                 200                 205

Glu Val Phe Asp Asn Leu Thr Asn Trp Lys Asn Ser Ala Gln
    210                 215                 220


<210> SEQ ID NO 15
<211> LENGTH: 167
<212> TYPE: PRT
<213> ORGANISM: Fusarium venenatum

<400> SEQUENCE: 15

Leu Pro Thr Gly Glu Asp Ala Ser Val Ser Lys Arg Gln Ser Val Asn
1               5                   10                  15

Thr Val Thr Asp Gln Leu Leu Phe Ser Val Thr Leu Pro Gln Phe Thr
            20                  25                  30

Ala Arg Arg Asn Ala Arg Asp Pro Pro Thr Val Asp Trp Thr Ser Asp
        35                  40                  45

Gly Cys Thr Ser Ser Pro Asp Asn Pro Phe Gly Phe Pro Phe Ile Pro
    50                  55                  60

Ala Cys Asn Arg His Asp Phe Gly Tyr His Asn Tyr Arg Ala Gln Ser
65                  70                  75                  80
```

-continued

```
Arg Phe Thr Val Ser Ala Lys Ser Arg Ile Asp Asn Asn Phe Lys Thr
                85                  90                  95

Asp Leu Tyr Phe Gln Cys Gln Ser Ser Ser Val Ser Gly Val Cys Arg
            100                 105                 110

Ala Leu Ala Asp Val Tyr Phe Ala Ala Val Arg Ala Phe Gly Gly Asp
        115                 120                 125

Asp Ala Thr Pro Gly Lys Arg Asp Glu Ala Leu Val Lys Glu Tyr Glu
    130                 135                 140

Lys Lys Val Glu Val Tyr Asn Lys Leu Val Glu Glu Ala Gln Lys Lys
145                 150                 155                 160

Gly Asp Leu Pro Arg Leu Asp
                165
```

PROCESS FOR PREPARING A PLANT-BASED FERMENTED DAIRY ALTERNATIVE

CROSS-REFERENCE TO RELATED APPLICATIONS

This application is a 35 U.S.C. 371 national application of international application no. PCT/EP2021/081398 filed Nov. 11, 2021, which claims priority or the benefit under 35 U.S.C. 119 of European application no. 21150341.2 filed Jan. 5, 2021. The disclosure of each application is fully incorporated herein by reference.

REFERENCE TO SEQUENCE LISTING

This application contains a Sequence Listing in computer readable form. The computer readable form is incorporated herein by reference.

FIELD OF THE INVENTION

The present invention relates to preparation of a plant-based fermented dairy alternative where the plant-based substrate is treated with an enzyme.

BACKGROUND OF THE INVENTION

There is an increasing consumer demand for plant-based alternatives to animal-based traditional foods such as meat and dairy products.

Vegetarian diets in general, and vegetarian sources of protein in particular, have increased in popularity as consumer interest in healthier and more eco-friendly eating habits has grown.

Plant-based fermented dairy alternatives such as plant-based yoghurt alternatives, e.g., so-called soy yoghurt, have appeared as an interesting alternative to traditional animal yoghurts also because of their reduced level of cholesterol and saturated fat and because they are free of lactose.

Therefore, there is a huge commercial interest in providing plant-based dairy alternatives such as plant-based fermented dairy alternatives.

It is an object of the present invention to improve the quality of plant-based fermented dairy alternatives such as yoghurt alternatives produced from soy, pea or other legumes.

WO2018/049853A1 discloses production of a fermented dairy milk product wherein a small amount of a proliferating agent produced from hydrolysed soy protein is added to dairy milk prior to fermentation.

WO2010/033985 discloses production of a frozen confection composition by mixing a protein hydrolysate, e.g. a soy protein hydrolysate or a combined soy/dairy protein hydrolysate, and an edible material, e.g. yoghurt, and freezing the composition.

SUMMARY OF THE INVENTION

The present inventors have surprisingly found that in the production of plant-based fermented dairy alternatives such as yoghurt alternatives, treatment of the plant-based substrate from which the fermented dairy alternative is produced with an endopeptidase improves the quality of the product. The treatment with the endopeptidase may be performed either as a pre-treatment step prior to fermentation, or it may be performed essentially at the same time as the fermentation.

Treatment with an endopeptidase resulted in quality improvements such as decreased syneresis, decreased viscosity or both—properties which can be inversely correlated in fermented dairy products produced from milk. Further, the visual appearance was improved, and a less grainy, less lumpy and/or smoother texture was observed.

For fermented dairy alternatives, an additional benefit may be a faster fermentation time. Such processing benefit can be used to increase the production capacity and it also reduces the risk of contamination since the fermented dairy alternatives are exposed for a shorter time to neutral pH and raised temperatures.

The present invention therefore relates to a process for preparing a plant-based fermented dairy alternative, the process comprising:

(a) treating a plant-based substrate with an endopeptidase; and (b) fermenting the plant-based substrate by incubating with a lactic acid bacterium to produce the plant-based fermented dairy alternative;

wherein step (a) is performed before and/or during step (b).

The present inventors have further found that inclusion of a phospholipase treatment resulted in an even more creamy and smooth texture and an even more appealing appearance. It resulted in improved parameters such as high cohesiveness and homogeneity which are important for the mouthfeel of the resulting product. Inclusion of a phospholipase treatment may also be used to increase the viscosity compared to treatment with an endopeptidase alone, thus enabling a tailoring of the viscosity to fit the desired product.

Therefore, in a preferred embodiment, the plant-based substrate is further treated with a phospholipase before, during or after step (a) and before or during step (b).

DETAILED DESCRIPTION OF THE INVENTION

Figure 1:
FIG. 1 shows the visual appearance of reference pea-yogurt 10% (from Example 3)

The present invention is directed to a process for preparing a plant-based fermented dairy alternative, the process comprising:

(a) treating a plant-based substrate with an endopeptidase; and (b) fermenting the plant-based substrate by incubating with a lactic acid bacterium to produce the plant-based fermented dairy alternative;

wherein step (a) is performed before and/or during step (b).

The plant-based substrate may be obtained from any plant, such as legumes, cereals (e.g. wheat, oats), pseudo-cereals (e.g. quinoa), grasses, pasture legumes (e.g. alfalfa, clover), rapeseed, nuts, almonds, vegetables, fruits, mushrooms, cottonseed, or any combination thereof.

The plant-based substrate may be obtained from more than one plant.

In a preferred embodiment, at least part of the plant-based substrate is obtained from legumes, such as from pulses (e.g. peas, lentils, faba bean, chickpea) or from oil crops (e.g. soybean, peanuts). In a more preferred embodiment, the plant-based substrate is obtained from soy, pea, chickpea, mung bean, lentils, faba bean or lupin, preferably from soy, pea, faba bean or lentils.

The plant-based substrate may be a plant-based milk alternative, such as soy milk or soy beverage, optionally fortified with a plant-based milk alternative powder such as soy milk powder or with concentrated or isolated protein such as soy protein isolate or soy protein concentrate. Or the plant-based substrate may be another plant-based milk alternative, such as coconut milk, oat milk or almond milk, preferably coconut milk, fortified with soy milk powder or with concentrated or isolated legume protein, preferably with soy protein, pea protein, lentil protein or faba bean protein, preferably in the form of an isolate or a concentrate. Or the plant-based substrate may be an aqueous solution or suspension of a plant-based milk alternative powder such as soy milk powder. Or the plant-based substrate may be an aqueous solution or suspension of a plant protein preparation, such as a plant protein isolate or a plant protein concentrate, preferably a legume protein isolate or legume protein concentrate, more preferably a soy protein isolate, a soy protein concentrate, a pea protein isolate, or a pea protein concentrate. Or the plant-based substrate may be any other suitable preparation obtained from a plant, such as, e.g., an aqueous suspension of a flour or the like obtained from a plant, such as from a part of a plant. The plant-based substrate may be a combination of any of the above.

The plant-based substrate may be oat milk, coconut milk, almond milk or another plant-based milk alternative, optionally fortified with plant protein, preferably legume protein, e.g., in the form of a flour, an isolate or a concentrate. Or it may be a plant-based milk alternative, such as, e.g., almond milk, which has been concentrated to increase the protein content.

In a preferred embodiment, the plant-based substrate is soy milk or soy beverage, optionally fortified with soy milk powder or with soy protein isolate or soy protein concentrate. In another preferred embodiment, the plant-based substrate is an aqueous solution or suspension of soy milk powder. In another preferred embodiment, the plant-based substrate is an aqueous solution or suspension of a soy protein isolate, a soy protein concentrate, a pea protein isolate, or a pea protein concentrate.

In another preferred embodiment, the plant-based substrate is (i) soy milk or soy beverage, optionally fortified with soy milk powder or with soy protein isolate or soy protein concentrate, or (ii) an aqueous solution or suspension of soy milk powder, soy protein isolate, soy protein concentrate, pea protein isolate, pea protein concentrate, or any combination thereof.

In another preferred embodiment, the plant-based substrate is (i) soy milk or soy beverage, optionally fortified with soy milk powder or with concentrated or isolated legume protein, (ii) another plant-based milk alternative, such as coconut milk, oat milk or almond milk, preferably coconut milk, fortified with soy milk powder or with concentrated or isolated legume protein, or (iii) an aqueous solution or suspension of soy milk powder or of isolated or concentrated legume protein. The legume protein is preferably soy protein, pea protein, lentil protein or faba bean protein, preferably in the form of an isolate or a concentrate.

The plant-based substrate may be obtained from more than one plant, such as, e.g., soy milk alternative fortified with, e.g., pea protein, or coconut milk, oat milk or almond milk fortified with, e.g., pea protein or soy protein.

Preferably, the plant-based substrate has a protein content of at least 2% (w/w). In one embodiment, the plant-based substrate has a protein content of at least 3% (w/w). In another embodiment, the plant-based substrate has a protein content of at least 5% (w/w).

Preferably, the plant-based substrate has a protein content of at most 12% (w/w), more preferably at most 10% (w/w).

Preferably, the plant-based substrate is 100% plant-based.

Preferably, all of the protein in the plant-based substrate is plant protein.

Preferably, at least 90% (w/w), preferably at least 95% (w/w), more preferably all of the protein in the plant-based fermented dairy alternative is plant protein.

Preferably, the protein in the plant-based substrate constitutes at least 50% (w/w), preferably at least 80% (w/w), more preferably at least 90% (w/w), even more preferably at least 95% (w/w), such as 100%, of the protein in the plant-based fermented dairy alternative.

Preferably, the plant-based substrate which has been treated with the endopeptidase and fermented by incubating with a lactic acid bacterium constitutes at least 50% (w/w), preferably at least 80% (w/w), more preferably at least 90% (w/w), even more preferably at least 95% (w/w), such as 100%, of the plant-based fermented dairy alternative.

Other ingredients may be added to the plant-based substrate, e.g., oil, such as plant oil, sugar, sucrose, fruit, yeast extract and/or peptone. Plant oil may be added to provide fat to the plant-based fermented dairy alternative. Sugar, sucrose or fruit may be added to sweeten the plant-based fermented dairy alternative. Yeast extract or peptone may be added to speed up fermentation.

The plant-based substrate may have been standardized and/or homogenized. The plant-based substrate may have been pasteurized or otherwise heat-treated.

A plant-based fermented dairy alternative in the context of the present invention is a plant-based product which is produced by fermentation and which is a plant-based alternative to a fermented dairy product produced by fermentation of a milk substrate based on milk obtained from a mammal.

Fermentation is performed by incubating with a lactic acid bacterium, preferably of the genus *Streptococcus, Lactococcus, Lactobacillus, Leuconostoc, Pseudoleuconostoc, Pediococcus, Propionibacterium, Enterococcus, Brevibacterium*, or *Bifidobacterium* or any combination thereof.

In one embodiment, fermentation is performed by incubating with a thermophilic lactic acid bacterium.

In one embodiment, fermentation is performed by incubating with a mesophilic lactic acid bacterium.

In another embodiment, fermentation is performed by incubating with a lactic acid bacterium combined with yeast.

In a preferred embodiment, the plant-based fermented dairy alternative is a yoghurt alternative, a set-type yoghurt alternative, a stirred yoghurt alternative, a strained yoghurt alternative, a drinking yoghurt alternative, a fermented milk drink alternative, a kefir alternative, a sour cream alternative, a greek-style yoghurt alternative, a skyr alternative or a cream cheese alternative.

A stirred yoghurt alternative may be produced by carrying out fermentation in fermentation tanks where the formed acid gel is disrupted e.g. by agitation after fermentation when the desired pH has been obtained. The stirred product may be partially cooled to 20-30° C. and flavoring ingredients may be added. The stirred product is pumped to filling line and filled in retail containers. The stirred yoghurt alternative may then be cooled and then stored.

A set yoghurt alternative may be fermented in retail container and not agitated after fermentation. After fermentation, a set yoghurt alternative may be cooled and then stored. The cooling may be carried out in blast chiller tunnel or in a refrigerated storage room.

The term "after fermentation" as used herein means when fermentation is ended and the desired pH obtained.

A strained yoghurt alternative, such as a Greek yoghurt alternative or a labneh alternative, is a yoghurt alternative that has been strained to remove part of its aqueous phase, thus resulting in a thicker consistency than an unstrained yoghurt alternative, while preserving yoghurt's distinctive sour taste.

The pH after fermentation may preferably be between 3.5 and 5.5, most preferably between 4 and 5.

In one embodiment, the plant-based fermented dairy alternative is a stirred yoghurt alternative wherein agitation is performed during or following the fermentation step.

In one embodiment, the plant-based fermented dairy alternative is cooled, preferably immediately.

A stirred yoghurt alternative may be cooled down to approx. 20-25° C. in the fermentation tank. Then, agitation, e.g. by stirring, may be performed to break the gel. The yoghurt alternative may then be pumped to the filling line followed by a second cooling step to storage temperature approximately 5° C. by blast chilling in cooling tunnels or slower in a refrigerated storage room.

Alternatively, for a stirred yoghurt alternative, the fermented product may be first stirred to break the gel, then cooled down to approximately 20-25° C. by heat exchanger in the line towards the filling station, and then in a second cooling step cooled down to storage temperature approximately 5° C. by blast chilling in cooling tunnels or slower in a refrigerated storage room.

The process for a set yoghurt alternative may be: After fermentation in retail pot (carried out in tempered room), the yoghurt alternative is cooled down to storage temperature approximately 5° C. by blast chilling in cooling tunnels or slower in a refrigerated storage room.

The process of the invention may further include a storage step after fermentation. This may be carried out after agitation, e.g. by stirring or pumping, and/or cooling (one or more times), preferably after both. Storage may be carried out at a low temperature, preferably less than 10° C., more preferably 0-10° C., such as 4-6° C.

In a preferred embodiment, the plant-based fermented dairy alternative is a spoonable plant-based fermented dairy alternative, such as a stirred yoghurt alternative, a set-type yoghurt alternative or a strained yoghurt alternative, or a drinkable plant-based fermented dairy alternative, such as a drinking yoghurt alternative or a kefir alternative.

In a more preferred embodiment, the plant-based fermented dairy alternative is a spoonable plant-based fermented dairy alternative, preferably a spoonable yoghurt alternative.

In the process of the present invention, a pasteurization step is preferably performed before step (b). This may be to thermally inactivate microorganisms and/or to better control the fermentation. Pasteurization before fermentation may also give a better structure of the plant-based fermented dairy alternative.

Pasteurization may be performed, e.g., at 80-95° C. for 1-30 minutes, such as at 80-85° C. for 30 minutes or at 90-95° C. for 2-15 minutes.

In step (a), the plant-based substrate is treated with an endopeptidase. Step (a) may be performed before and/or during step (b).

In the process of the invention, step (a) may be performed before step (b). A pasteurization step may be performed before step (a). And/or a pasteurization step may be performed after step (a) and before step (b). In that case, the pasteurization will inactivate the enzymes prior to the fermentation. A pasteurization step may be performed before step (a) and another one after step (a) but before step (b).

In the process of the invention, step (a) may be performed before and during step (b). I.e., the endopeptidase may be added to the plant-based substrate and after incubation for some time, e.g., 0.5-20 hours, the lactic acid bacterium is added and the incubation is continued until the desired pH is reached.

In a preferred embodiment, a pasteurization step is performed before step (a).

In a preferred embodiment, step (a) is performed before and during step (b) and a pasteurization step is performed before step (a).

In another preferred embodiment, step (a) and step (b) are performed simultaneously, i.e., the endopeptidase and the lactic acid bacterium are added at the same time or essentially at the same time, and a pasteurization step is performed before step (a).

If step (a) is performed before step (b), the enzyme treatment may be performed, e.g., at 40-55° C., such as at 45-55° C., for 15 minutes to 10 hours, such as for 30 minutes to 3 hours.

If step (a) is performed before step (b), the enzyme treatment may be performed, e.g., at 4-10° C., such as at 4-6° C., for 3 hours to 20 hours, such as for 5 to 15 hours.

The fermentation in step (b) is performed until the desired pH is reached. It is well-known in the art how to choose the optimal temperature and incubation time for the fermentation. The fermentation may be performed, e.g., at 40-45° C. for 3-12 hours, such as for 4-8 hours. Lower temperatures such as down to 20-30° C., may be used for mesophilic cultures.

In a preferred embodiment, the viscosity of the plant-based fermented dairy alternative is reduced by at least 25%, preferably at least 40%, compared to a plant-based fermented dairy alternative prepared by the same process but without addition of a endopeptidase. The viscosity may be determined after six days storage at 4° C. by allowing a sample of the plant-based fermented dairy alternative to set for 1 hour at 4° C. followed by viscosity measurement carried out at 20° C. at 50 rpm and the viscosity value read after 70 seconds.

Reduction in viscosity is often desired, in particular for fermented dairy alternatives having a high protein content. For fermented dairy alternatives having a low protein content, a reduction in viscosity may not be desired.

In a preferred embodiment, the plant-based fermented dairy alternative expels at least 10%, preferably at least 20%, less liquid in a forced syneresis test compared to a plant-based fermented dairy alternative prepared by the same process but without addition of an endopeptidase. The forced syneresis test may be performed after six days storage at 4° C. by centrifugation of the plant-based fermented dairy alternative for 15 min at 2643×g. The weight of remaining solid is recorded after removal of supernatant and the amount of expelled liquid is calculated using the formula:

(weight of fermented dairy alternative sample−weight of solid phase)/(weight of fermented dairy alternative sample) *100%.

In one embodiment, a hydrocolloid or stabilizer such as pectin is added to the plant-based fermented dairy alternative, in which case addition of an endopeptidase will likely not result in further reduction of syneresis, since syneresis will already be very low. However, treatment with an endopeptidase will still confer other benefits. In another embodiment, no hydrocolloid or stabilizer is added to the plant-based fermented dairy alternative. In another embodiment, no pectin is added to the plant-based fermented dairy alternative. From a clean-label perspective, avoidance of hydrocolloid or stabilizer such as pectin is preferred.

In a preferred embodiment, the plant-based fermented dairy alternative has a smoother texture compared to a plant-based fermented dairy alternative prepared by the same process but without addition of an endopeptidase. The texture may be visually evaluated after six days storage at 4° C. by placing a sample of the plant-based fermented dairy alternative on the backside of a black plastic spoon.

In a preferred embodiment, the plant-based fermented dairy alternative has a less grainy texture compared to a plant-based fermented dairy alternative prepared by the same process but without addition of an endopeptidase. The texture may be visually evaluated after six days storage at 4° C. by placing a sample of the plant-based fermented dairy alternative on the backside of a black plastic spoon.

In a preferred embodiment, the plant-based substrate is fermented with a lactic acid bacterium in step (b) and the plant-based fermented dairy alternative is a plant-based fermented dairy alternative. Preferably in such process according to the invention, the fermentation time until the desired pH is reached is reduced by at least 10%, more preferably at least 20%, compared to the same process but without addition of an endopeptidase.

In a preferred embodiment of the process of the invention, the plant-based substrate is further treated with a phospholipase before, during or after step (a) and before or during step (b).

The treatment with the endopeptidase and the phospholipase may be performed sequentially. E.g., the phospholipase may be added to the plant-based substrate, which has optionally been pasteurized, and after some time, such as, e.g., 30-60 minutes, the endopeptidase is added. Or the treatment with the phospholipase may be performed first, optionally followed by a pasteurization step, and then the endopeptidase is added, e.g., at the same time as the lactic acid bacterium.

Alternatively, the endopeptidase may be added to the plant-based substrate, which has optionally been pasteurized, and after some time, such as, e.g., 30-60 minutes, the phospholipase is added. Or the treatment with the endopeptidase may be performed first, optionally followed by a pasteurization step, and then the phospholipase is added, e.g., at the same time as the lactic acid bacterium.

Alternatively, both enzymes and the lactic acid bacterium may be added at the same time or essentially at the same time. Or the phospholipase may be added first, then the endopeptidase, then the lactic acid bacterium. Or the phospholipase may be added first, then the lactic acid bacterium, then the endopeptidase. Or the endopeptidase may be added first, then the phospholipase, then the lactic acid bacterium. Or the endopeptidase may be added first, then the lactic acid bacterium, then the phospholipase. Or the lactic acid bacterium may be added first, then the enzymes.

In a preferred embodiment, the plant-based substrate is treated with the phospholipase before step (a). In another preferred embodiment, the plant-based substrate is treated with the phospholipase followed by pasteurization before step (a). In another preferred embodiment, the plant-based substrate is treated with the phospholipase followed by pasteurization before step (a), and step (a) and step (b) are performed simultaneously.

Endopeptidase

In the process of the invention, a plant-based substrate is treated with an endopeptidase.

In a preferred embodiment, the endopeptidase is a specific endopeptidase.

A specific endopeptidase may be defined as an endopeptidase having a preference, preferably a strong preference, for cleaving before or after one or two specific amino acids. The skilled person will know whether a certain endopeptidase is specific or not.

In a preferred embodiment, the specific endopeptidase has a preference for cleaving before or after, preferably after, a non-hydrophobic amino acid.

In a preferred embodiment, the endopeptidase is selected from the group consisting of:

i) a polypeptide having an amino acid sequence which is at least 60%, preferably at least 70%, at least 80%, at least 90%, at least 95%, at least 98%, at least 99%, or 100%, identical to any of SEQ ID NOs: 1, 2, 3, 4, 5, 6, 7, 8, 9, 10, 11, 12, 13 or 14; and
ii) a variant of the polypeptide of any of SEQ ID NOs: 1, 2, 3, 4, 5, 6, 7, 8, 9, 10, 11, 12, 13 or 14 comprising a substitution, deletion, and/or insertion at one or more positions.

In a more preferred embodiment, the endopeptidase is selected from the group consisting of:

i) a polypeptide having an amino acid sequence which is at least 60%, preferably at least 70%, at least 80%, at least 90%, at least 95%, at least 98%, at least 99%, or 100%, identical to any of SEQ ID NOs: 1, 13 or 14; and
ii) a variant of the polypeptide of any of SEQ ID NOs: 1, 13 or 14 comprising a substitution, deletion, and/or insertion at one or more positions.

The endopeptidase may be a trypsin-like endopeptidase, preferably a trypsin-like endopeptidase selected from the group consisting of:

i) a polypeptide having an amino acid sequence which is at least 60%, preferably at least 70%, at least 80%, at least 90%, at least 95%, at least 98%, at least 99%, or 100%, identical to any of SEQ ID NOs: 1, 2, 3, 4, 5, 6, 7, 8, 9, 10, 11 or 12; and
ii) a variant of the polypeptide of any of SEQ ID NOs: 1, 2, 3, 4, 5, 6, 7, 8, 9, 10, 11, or 12 comprising a substitution, deletion, and/or insertion at one or more positions.

A trypsin-like endopeptidase is an endopeptidase having specificity for cleaving after Lys and/or Arg.

In a more preferred embodiment, the endopeptidase is a trypsin-like endopeptidase selected from the group consisting of:

i) a polypeptide having an amino acid sequence which is at least 60%, preferably at least 70%, at least 80%, at least 90%, at least 95%, at least 98%, at least 99%, or 100%, identical to SEQ ID NO: 1; and
ii) a variant of the polypeptide of SEQ ID NO: 1 comprising a substitution, deletion, and/or insertion at one or more positions.

The trypsin-like endopeptidase is preferably derived from a strain of *Fusarium*, more preferably from *Fusarium oxysporum*.

The endopeptidase may be a lysine-specific endopeptidase, preferably a lysine-specific endo-peptidase selected from the group consisting of:

i) a polypeptide having an amino acid sequence which is at least 60%, preferably at least 70%, at least 80%, at least 90%, at least 95%, at least 98%, at least 99%, or 100%, identical to SEQ ID NO: 13; and ii) a variant of the polypeptide of SEQ ID NO: 13 comprising a substitution, deletion, and/or insertion at one or more positions.

The lysine-specific endopeptidase is preferably derived from a strain of *Achromobacter*, more preferably from *Achromobacter lyticus*.

The endopeptidase may be a glutamyl-specific endopeptidase, preferably a glutamyl-specific endopeptidase selected from the group consisting of:

i) a polypeptide having an amino acid sequence which is at least 60%, preferably at least 70%, at least 80%, at least 90%, at least 95%, at least 98%, at least 99%, or 100%, identical to SEQ ID NO: 14; and ii) a variant of the polypeptide of SEQ ID NO: 14 comprising a substitution, deletion, and/or insertion at one or more positions.

The glutamyl-specific endopeptidase is preferably derived from a strain of *Bacillus*, more preferably from *Bacillus licheniformis*.

The endopeptidase may be a proline-specific endopeptidase.

For purposes of the present invention, the sequence identity between two amino acid sequences is determined as the output of "longest identity" using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 6.6.0 or later. The parameters used are a gap open penalty of 10, a gap extension penalty of 0.5, and the EBLOSUM62 (EMBOSS version of BLOSUM62) substitution matrix. In order for the Needle program to report the longest identity, the-nobrief option must be specified in the command line. The output of Needle labeled "longest identity" is calculated as follows:

(Identical Residues×100)/(Length of Alignment−Total Number of Gaps in Alignment)

In the context of the present invention, a trypsin-like endopeptidase is an endopeptidase which specifically cleaves on the carboxy terminal side of arginine and/or lysine. I.e., it specifically cleaves on the carboxy terminal side of arginine or lysine or both. In a preferred embodiment, the trypsin-like endopeptidase specifically cleaves on the carboxy terminal side of arginine and lysine.

In the context of the present invention, a lysine-specific endopeptidase is an endopeptidase which specifically cleaves on the carboxy terminal side of lysine. A lysine-specific endopeptidase may also be termed a lysyl-specific endopeptidase.

Preferably, the trypsin-like or lysine-specific endopeptidase has a specificity for cleaving after Arg or Lys (whichever is the larger) which is at least 100-fold higher than its specificity for cleaving after any one of Ala, Asp, Glu, Ile, Leu, Met, Phe, Tyr or Val (whichever is the larger).

In an embodiment, the trypsin-like or lysine-specific endopeptidase has a specificity for cleaving after Arg or Lys (whichever is the larger) which is at least 10-fold, such as at least 20-fold or at least 50-fold, higher than its specificity for cleaving after any one of Ala, Asp, Glu, Ile, Leu, Met, Phe, Tyr or Val (whichever is the larger). In another embodiment, the trypsin-like or lysine-specific endopeptidase has a specificity for cleaving after Arg or Lys (whichever is the larger) which is at least 200-fold, such as at least 500-fold or at least 1000-fold, higher than its specificity for cleaving after any one of Ala, Asp, Glu, Ile, Leu, Met, Phe, Tyr or Val (whichever is the larger).

Preferably, such determination of specificities should be performed at a pH-value where the activity of the endopeptidase is at least half of the activity of the endopeptidase at its pH optimum.

Preferably, any such relative specificities are to be determined using Suc-AAP-X-pNA substrates as described in Example 3 of WO 2008/125685 which is incorporated by reference.

In the context of the present invention, a glutamyl-specific endopeptidase is an endopeptidase which has a strong preference for glutamic acid in the P1 position and which releases peptides with a glutamic acid in the C-terminal.

In an embodiment, the glutamyl-specific endopeptidase has a specificity for cleaving after Glu which is at least 10-fold, such as at least 20-fold or at least 50-fold, higher than its specificity for cleaving after any one of Ala, Arg, Asp, Ile, Leu, Lys, Met, Phe, Tyr or Val (whichever is the larger).

Preferably, a trypsin-like endopeptidase to be used in the process of the invention is classified in EC 3.4.21.4.

Preferably, a lysine-specific endopeptidase to be used in the process of the invention is classified in EC 3.4.21.50.

Preferably, a glutamyl-specific endopeptidase to be used in the process of the invention is classified in EC 3.4.21.19.

Any endopeptidase, in particular any specific endopeptidase, such as any trypsin-like or lysine-specific or glutamyl-specific or proline-specific endopeptidase, can be used in the process of the invention. The origin of such endopeptidase to be used in the process of the invention is not important for a successful outcome.

The endopeptidase to be used in the process of the invention may be derived from any source. It may be derived from an animal, e.g., it may be a porcine or a bovine trypsin. Such porcine or bovine trypsin may have been extracted, e.g., from porcine or bovine pancreas, or it may have been expressed in a microorganism, such as in a filamentous fungus or yeast, or in a bacterium.

The endopeptidase to be used in the process of the invention may be derived from a microorganism, such as from a filamentous fungus or yeast, or from a bacterium.

In a preferred embodiment, the endopeptidase is derived from a fungus. In another preferred embodiment, the endopeptidase is derived from a bacterium.

The endopeptidase may be extracellular. It may have a signal sequence at its N-terminus, which is cleaved off during secretion.

The endopeptidase may be derived from any of the sources mentioned herein. The term "derived" means in this context that the enzyme may have been isolated from an organism where it is present natively, i.e. the amino acid sequence of the endopeptidase is identical to a native polypeptide. The term "derived" also means that the enzyme may have been produced recombinantly in a host organism, the recombinantly produced enzyme having either an amino acid sequence which is identical to a native enzyme or having a modified amino acid sequence, e.g. having one or more amino acids which are deleted, inserted and/or substituted, i.e. a recombinantly produced enzyme which is a mutant of a native amino acid sequence. Within the meaning of a native enzyme are included natural variants. Furthermore, the term "derived" includes enzymes produced synthetically by, e.g., peptide synthesis. The term "derived" also encompasses enzymes which have been modified e.g. by glycosylation, phosphorylation etc., whether in vivo or in vitro. With respect to recombinantly produced enzymes the term "derived from" refers to the identity of the enzyme and not the identity of the host organism in which it is produced recombinantly.

The endopeptidase may be obtained from a microorganism by use of any suitable technique. For instance, an enzyme preparation may be obtained by fermentation of a suitable microorganism and subsequent isolation of an endopeptidase preparation from the resulting fermented broth or microorganism by methods known in the art. The endopeptidase may also be obtained by use of recombinant DNA techniques. Such method normally comprises cultivation of a host cell transformed with a recombinant DNA vector comprising a DNA sequence encoding the endopeptidase and the DNA sequence being operationally linked with an appropriate expression signal such that it is capable of expressing the enzyme in a culture medium under conditions permitting the expression of the enzyme and recovering the enzyme from the culture. The DNA sequence may also be incorporated into the genome of the host cell. The DNA sequence may be of genomic, cDNA or synthetic origin or any combinations of these, and may be isolated or synthesized in accordance with methods known in the art.

The endopeptidase may be purified. The term "purified" as used herein covers endopeptidase enzyme protein essentially free from insoluble components from the production organism. The term "purified" also covers endopeptidase enzyme protein essentially free from insoluble components from the native organism from which it is obtained. Preferably, it is also separated from some of the soluble components of the organism and culture medium from which it is derived. More preferably, it is separated by one or more of the unit operations: filtration, precipitation, or chromatography.

Preferably, the endopeptidase is purified from its production organism. More preferably, the endopeptidase is purified from its production organism meaning that the endopeptidase preparation does not comprise living production organism cells.

Accordingly, the endopeptidase may be purified, viz. only minor amounts of other proteins being present. The expression "other proteins" relate in particular to other enzymes. The term "purl-fled" as used herein also refers to removal of other components, particularly other proteins and most particularly other enzymes present in the cell of origin of the endopeptidase. The endopeptidase may be "substantially pure", i.e. free from other components from the organism in which it is produced, i.e., e.g., a host organism for recombinantly produced endopeptidase. Preferably, the endopeptidase is an at least 40% (w/w) pure enzyme protein preparation, more preferably at least 50%, 60%, 70%, 80% or even at least 90% pure.

The term endopeptidase includes whatever auxiliary compounds may be necessary for the enzyme's catalytic activity, such as, e.g., an appropriate acceptor or cofactor, which may or may not be naturally present in the reaction system.

The endopeptidase may be in any form suited for the use in question, such as, e.g., in the form of a dry powder or granulate, a non-dusting granulate, a liquid, a stabilized liquid, or a protected enzyme.

A trypsin-like or lysine-specific or glutamyl-specific endopeptidase to be used in the process of the invention may be added at a concentration of 0.1-1000 mg enzyme protein per kg substrate protein, preferably 0.5-500 mg enzyme protein per kg substrate protein, more preferably 1-100 mg enzyme protein per kg substrate protein.

The dosage will depend on parameters such as the temperature, the incubation time and the dairy alternative recipe. The skilled person will know how to determine the optimal enzyme dosage.

A trypsin-like or lysine-specific endopeptidase to be used in the process of the invention may be added at a concentration of 1-3000 KPRU/kg substrate protein, preferably 5-2000 KPRU/kg substrate protein, more preferably 25-600 KPRU/kg substrate protein.

Trypsin-like and lysine-specific endopeptidases hydrolyse the chromophoric substrates Ac-Arg-p-nitro-anilide (Ac-Arg-pNA) and/or Ac-Lys-p-nitro-anilide (Ac-Arg-pNA). The liberated pNA produces an absorption increase at 405 nm, which is proportional to enzyme activity. One KPRU is equivalent to the amount of enzyme that produces 1 micromole p-nitroaniline per minute, when Ac-Arg-pNA or Ac-Lys-pNA is incubated with the enzyme at pH 8.0 at 37° C. The activity may be determined relative to a standard of declared strength.

Phospholipase

In a preferred embodiment of the process of the invention, the plant-based substrate is further treated with a phospholipase.

In a preferred embodiment, the phospholipase is a phospholipase A1 or a phospholipase A2, preferably a phospholipase A1.

In a preferred embodiment, the phospholipase is selected from the group consisting of:

i) a polypeptide having an amino acid sequence which is at least 60%, preferably at least 70%, at least 80%, at least 90%, at least 95%, at least 98%, at least 99%, or 100%, identical to SEQ ID NO: 15; and
ii) a variant of the polypeptide of SEQ ID NO: 15 comprising a substitution, deletion, and/or insertion at one or more positions.

The phospholipase is preferably derived from a strain of *Fusarium*, more preferably from *Fusarium venenatum*.

Preferably, a phospholipase to be used in the process of the invention is classified in EC 3.1.1.32.

Any phospholipase, such as any phospholipase A1 or A2, can be used in the process of the invention. The origin of such phospholipase to be used in the process of the invention is not important for a successful outcome.

The phospholipase to be used in the process of the invention is preferably derived from a microorganism, such as from a filamentous fungus or yeast, or from a bacterium.

In a preferred embodiment, the phospholipase is derived from a fungus. In another preferred embodiment, the phospholipase is derived from a bacterium.

The phospholipase may be extracellular. It may have a signal sequence at its N-terminus, which is cleaved off during secretion.

The phospholipase may be derived from any of the sources mentioned herein. The term "derived" means in this context that the enzyme may have been isolated from an organism where it is present natively, i.e. the amino acid sequence of the phospholipase is identical to a native polypeptide. The term "derived" also means that the enzyme may have been produced recombinantly in a host organism, the recombinantly produced enzyme having either an amino acid sequence which is identical to a native enzyme or having a modified amino acid sequence, e.g. having one or more amino acids which are deleted, inserted and/or substituted, i.e. a recombinantly produced enzyme which is a mutant of a native amino acid sequence. Within the meaning of a native enzyme are included natural variants. Furthermore, the term "derived" includes enzymes produced synthetically by, e.g., peptide synthesis. The term "derived" also encompasses enzymes which have been modified e.g. by glycosylation, phosphorylation etc., whether in vivo or in vitro. With respect to recombinantly produced enzymes the term "derived from" refers to the identity of the enzyme and not the identity of the host organism in which it is produced recombinantly.

The phospholipase may be obtained from a microorganism by use of any suitable technique. For instance, an enzyme preparation may be obtained by fermentation of a suitable microorganism and subsequent isolation of a phospholipase preparation from the resulting fermented broth or microorganism by methods known in the art. The phospholipase may also be obtained by use of recombinant DNA techniques. Such method normally comprises cultivation of a host cell transformed with a recombinant DNA vector comprising a DNA sequence encoding the phospholipase and the DNA sequence being operationally linked with an appropriate expression signal such that it is capable of expressing the enzyme in a culture medium under conditions permitting the expression of the enzyme and recovering the enzyme from the culture. The DNA sequence may also be incorporated into the genome of the host cell. The DNA sequence may be of genomic, cDNA or synthetic origin or any combinations of these, and may be isolated or synthesized in accordance with methods known in the art.

The phospholipase may be purified. The term "purified" as used herein covers phospholipase enzyme protein essentially free from insoluble components from the production organism. The term "purified" also covers phospholipase enzyme protein essentially free from insoluble components from the native organism from which it is obtained. Preferably, it is also separated from some of the soluble components of the organism and culture medium from which it is derived. More preferably, it is separated by one or more of the unit operations: filtration, precipitation, or chromatography.

Preferably, the phospholipase is purified from its production organism. More preferably, the phospholipase is purified from its production organism meaning that the phospholipase preparation does not comprise living production organism cells.

Accordingly, the phospholipase may be purified, viz. only minor amounts of other proteins being present. The expression "other proteins" relate in particular to other enzymes. The term "purified" as used herein also refers to removal of other components, particularly other proteins and most particularly other enzymes present in the cell of origin of the phospholipase. The phospholipase may be "substantially pure", i.e. free from other components from the organism in which it is produced, i.e., e.g., a host organism for recombinantly produced phospholipase. Preferably, the phospholipase is an at least 40% (w/w) pure enzyme protein preparation, more preferably at least 50%, 60%, 70%, 80% or even at least 90% pure.

The term phospholipase includes whatever auxiliary compounds may be necessary for the enzyme's catalytic activity, such as, e.g., an appropriate acceptor or cofactor, which may or may not be naturally present in the reaction system.

The phospholipase may be in any form suited for the use in question, such as, e.g., in the form of a dry powder or granulate, a non-dusting granulate, a liquid, a stabilized liquid, or a protected enzyme.

A phospholipase to be used in the process of the invention may be added at a concentration of 0.0001-1 EEU/g of plant-based substrate. The plant-base substrate is inclusive of the water content.

The dosage will depend on parameters such as the substrate, the temperature, the incubation time and the dairy alternative recipe. The skilled person will know how to determine the optimal enzyme dosage.

PREFERRED EMBODIMENTS

1. A process for preparing a plant-based fermented dairy alternative, the process comprising:
   (a) treating a plant-based substrate with an endopeptidase; and
   (b) fermenting the plant-based substrate by incubating with a lactic acid bacterium to produce the plant-based fermented dairy alternative;

wherein step (a) is performed before and/or during step (b).

2. The process of embodiment 1, wherein at least part of the plant-based substrate is obtained from legumes, preferably from soy, pea, chickpea, mung bean, lentils, faba bean and/or lupin, more preferably from soy, pea, lentils and/or faba bean, most preferably from soy and/or pea; preferably where at least 50%, such as at least 80% or at least 90%, of the protein in the plant-based substrate is obtained from legumes, preferably from soy, pea, chickpea, mung bean, lentils, faba bean and/or lupin, more preferably from soy, pea, lentils and/or faba bean, most preferably from soy and/or pea.

3. The process of any of the preceding embodiments, wherein the plant-based substrate is obtained from legumes, preferably from soy, pea, chickpea, mung bean, lentils, faba bean or lupin, more preferably from soy, pea, lentils or faba bean, most preferably from soy or pea.

4. The process of any of the preceding embodiments, wherein the plant-based substrate is (i) soy milk or soy beverage, optionally fortified with soy milk powder or with concentrated or isolated legume protein, (ii) another plant-based milk alternative, such as coconut milk, oat milk or almond milk, preferably coconut milk, fortified with soy milk powder or with concentrated or isolated legume protein, or (iii) an aqueous solution or suspension of soy milk powder or of isolated or concentrated legume protein.

5. The process of the preceding embodiment, wherein the legume protein is soy protein, pea protein, lentil protein and/or faba bean protein, preferably in the form of an isolate or a concentrate.

6. The process of any of the preceding embodiments, wherein the plant-based substrate is (i) a plant-based milk alternative, preferably soy milk or soy beverage, optionally fortified with plant-based milk alternative powder such as soy milk powder or with concentrated or isolated protein such as soy protein isolate or soy protein concentrate, or (ii) an aqueous solution or suspension of a plant-based milk alternative powder such as soy milk powder or of a plant protein isolate or concentrate, preferably a legume protein isolate or concentrate, more preferably a soy protein or pea protein isolate or concentrate.

7. The process of any of the preceding embodiments, wherein the plant-based substrate has a protein content of at least 2%, preferably at least 3% (w/w).

8. The process of any of the preceding embodiments, wherein the plant-based substrate has a protein content of at least 5% (w/w).

9. The process of any of the preceding embodiments, wherein the plant-based substrate has a protein content of at most 12%, preferably at most 10% (w/w).

10. The process of any of the preceding embodiments, wherein the plant-based substrate has a protein content of 2-12%, preferably 3-12% (w/w).

11. The process of any of the preceding embodiments, wherein the plant-based substrate has a protein content of 5-12%.

12. The process of any of the preceding embodiments, wherein the plant-based substrate is 100% plant-based.

13. The process of any of the preceding embodiments, wherein all of the protein in the plant-based substrate is plant protein.

14. The process of any of the preceding embodiments, wherein at least 90% (w/w), preferably at least 95% (w/w), more preferably all of the protein in the plant-based fermented dairy alternative is plant protein.

15. The process of any of the preceding embodiments, wherein the protein in the plant-based substrate constitutes at least 50% (w/w), preferably at least 80% (w/w), more preferably at least 90% (w/w), even more preferably at least 95% (w/w), such as 100%, of the protein in the plant-based fermented dairy alternative.

16. The process of any of the preceding embodiments, wherein the plant-based substrate which has been treated with the endopeptidase and fermented by incubating with a lactic acid bacterium constitutes at least 50% (w/w), preferably at least 80% (w/w), more preferably at least 90% (w/w), even more preferably at least 95% (w/w), such as 100%, of the plant-based fermented dairy alternative.

17. The process of any of the preceding embodiments, wherein the plant-based fermented dairy alternative is a yoghurt alternative, a set-type yoghurt alternative, a stirred yoghurt alternative, a strained yoghurt alternative, a drinking yoghurt alternative, a fermented milk drink alternative, a kefir alternative, a sour cream alternative, a greek-style yoghurt alternative, a skyr alternative or a cream cheese alternative.

18. The process of any of the preceding embodiments, wherein the plant-based fermented dairy alternative is a spoonable plant-based fermented dairy alternative, such as a stirred yoghurt alternative, a set-type yoghurt alternative or a strained yoghurt alternative, or a drinkable plant-based fermented dairy alternative, such as a drinking yoghurt alternative or a kefir alternative.

19. The process of any of the preceding embodiments, wherein the plant-based fermented dairy alternative is a spoonable plant-based fermented dairy alternative, such as a stirred yoghurt alternative or a set-type yoghurt alternative.

20. The process of any of the preceding embodiments, wherein pasteurization is performed before step (b).

21. The process of any of the preceding embodiments, wherein pasteurization is performed before step (a).

22. The process of any of the preceding embodiments, wherein heat treatment, preferably at a temperature of 95-120° C., is performed after step (b).

23. The process of any of the preceding embodiments, wherein step (a) and step (b) are performed simultaneously.

24. The process of the preceding embodiment, wherein the lactic acid bacterium is of the genus *Streptococcus, Lactococcus, Lactobacillus, Leuconostoc, Pseudoleuconostoc, Pediococcus, Propionibacterium, Enterococcus, Brevibacterium*, or *Bifidobacterium* or any combination thereof.

25. The process of any of the preceding embodiments wherein the fermentation time is reduced by at least 10%, preferably at least 20%, compared to the same process but without addition of an endopeptidase.

26. The process of any of the preceding embodiments, wherein the endopeptidase is a specific endopeptidase, preferably a specific endopeptidase having a preference for cleaving before or after one or two specific amino acids.

27. The process of the preceding embodiment, wherein the specific endopeptidase has a preference for cleaving before or after, preferably after, a non-hydrophobic amino acid.

28. The process of any of the preceding embodiments, wherein the endopeptidase is selected from the group consisting of:

i) a polypeptide having an amino acid sequence which is at least 60%, preferably at least 70%, at least 80%, at least 90%, at least 95%, at least 98%, at least 99%, or 100%, identical to any of SEQ ID NOs: 1, 2, 3, 4, 5, 6, 7, 8, 9, 10, 11, 12, 13 or 14; and ii) a variant of the polypeptide of any of SEQ ID NOs: 1, 2, 3, 4, 5, 6, 7, 8, 9, 10, 11, 12, 13 or 14 comprising a substitution, deletion, and/or insertion at one or more positions.

29. The process of any of the preceding embodiments, wherein the endopeptidase is selected from the group consisting of:

i) a polypeptide having an amino acid sequence which is at least 60%, preferably at least 70%, at least 80%, at least 90%, at least 95%, at least 98%, at least 99%, or 100%, identical to any of SEQ ID NOs: 1, 13 or 14; and ii) a variant of the polypeptide of any of SEQ ID NOs: 1, 13 or 14 comprising a substitution, deletion, and/or insertion at one or more positions.

30. The process of any of the preceding embodiments, wherein the endopeptidase is a trypsin-like endopeptidase, a lysine-specific endopeptidase, a glutamyl-specific endopeptidase, or a proline-specific endopeptidase.

31. The process of any of the preceding embodiments, wherein the endopeptidase is a trypsin-like endopeptidase, preferably derived from a strain of *Fusarium*, more preferably from *Fusarium oxysporum*, a lysine-specific endopeptidase, preferably derived from a strain of *Achromobacter*, more preferably from *Achromobacter lyticus*, or a glutamyl-specific endopeptidase, preferably derived from a strain of *Bacillus*, more preferably from *Bacillus licheniformis*.

32. The process of the preceding embodiment, wherein the trypsin-like or lysine-specific endopeptidase has a specificity for cleaving after Arg or Lys (whichever is the larger) which is at least 100-fold higher than its specificity for cleaving after any one of Ala, Asp, Glu, Ile, Leu, Met, Phe, Tyr or Val (whichever is the larger).

33. The process of any of the two preceding embodiments, wherein the glutamyl-specific endopeptidase has a strong preference for glutamic acid in the P1 position releasing peptides with a glutamic acid in the C-terminal.

34. The process of any of the three preceding embodiments, wherein the glutamyl-specific endopeptidase has a specificity for cleaving after Glu which is at least 10-fold, such as at least 20-fold or at least 50-fold, higher than its specificity for cleaving after any one of Ala, Arg, Asp, Ile, Leu, Lys, Met, Phe, Tyr or Val (whichever is the larger).

35. The process of any of the preceding embodiments, wherein the viscosity of the plant-based fermented dairy alternative is reduced by at least 25%, preferably at least 40%, compared to a plant-based fermented dairy alternative prepared by the same process but without addition of an endopeptidase.

36. The process of any of the preceding embodiments, wherein the viscosity of the plant-based fermented dairy alternative is reduced by at least 25%, preferably at least 40%, compared to a plant-based fermented dairy alternative prepared by the same process but without addition of an endopeptidase, where the viscosity is determined after six days storage at 4° C. by allowing a sample of the plant-based fermented dairy alternative to set for 1 hour at 4° C. followed by viscosity measurement carried out at 20° C. at 50 rpm and the viscosity value read after 70 seconds.

37. The process of any of the preceding embodiments, wherein the plant-based fermented dairy alternative expels at least 10%, preferably at least 20%, less liquid in a forced syneresis test compared to a plant-based fermented dairy alternative prepared by the same process but without addition of an endopeptidase, where the forced syneresis test is performed after six days storage at 4° C. by centrifugation of the plant-based fermented dairy alternative for 15 min at 2643×g, and where the weight of remaining solid is recorded after removal of supernatant and the amount of expelled liquid calculated using the formula: (weight of fermented dairy alternative sample−weight of solid phase)/(weight of fermented dairy alternative sample)*100%.

38. The process of any of the preceding embodiments, wherein the plant-based fermented dairy alternative has a more smooth texture compared to a plant-based fermented dairy alternative prepared by the same process but without addition of an endopeptidase, where the texture is visually evaluated after six days storage at 4° C. by placing a sample of the plant-based fermented dairy alternative on the back-side of a black plastic spoon 39. The process of any of the preceding embodiments, wherein the plant-based substrate is further treated with a phospholipase before, during or after step (a) and before or during step (b).

40. The process of the preceding embodiment, wherein the phospholipase is a phospholipase A1 or a phospholipase A2, preferably a phospholipase A1.

41. The process of any of the two preceding embodiments, wherein the phospholipase is selected from the group consisting of:

i) a polypeptide having an amino acid sequence which is at least 60%, preferably at least 70%, at least 80%, at least 90%, at least 95%, at least 98%, at least 99%, or 100%, identical to SEQ ID NO: 15; and ii) a variant of the polypeptide of SEQ ID NO: 15 comprising a substitution, deletion, and/or insertion at one or more positions.

42. The process of any of the three preceding embodiments, wherein the phospholipase is a fungal phospholipase, preferably derived from a strain of *Fusarium*, more preferably from *Fusarium venenatum.*

43. A plant-based fermented dairy alternative obtainable by the process of any of the preceding embodiments.

44. Use of an endopeptidase, preferably a specific endopeptidase, in the production of a plant-based fermented dairy alternative.

45. Use of an endopeptidase, preferably a specific endopeptidase, and a phospholipase in the production of a plant-based fermented dairy alternative.

EXAMPLES

Throughout the examples, the terms “yoghurt” and “milk” mean a plant-based yoghurt alternative and milk alternative, respectively, unless otherwise specified.

Method 1

Trypsin-like and lysine-specific endopeptidases hydrolyse the chromophoric substrates Ac-Arg-p-nitro-anilide (Ac-Arg-pNA) and/or Ac-Lys-p-nitro-anilide (Ac-Arg-pNA). The liberated pNA produces an absorption increase at 405 nm, which is proportional to enzyme activity. One KPRU is equivalent to the amount of enzyme that produces 1 micromole p-nitroaniline per minute, when Ac-Arg-pNA or Ac-Lys-pNA is incubated with the enzyme at pH 8.0 at 37° C. The activity may be determined relative to a standard of declared strength.

Method 2

EEU may be determined as follows: Lecitin is used as the substrate and the amount of free fatty acids generated is quantified colorimetrically using a Wako NEFA-HR kit at 37° C. and at pH 6.9. A Galaya Enhance sample of known activity may be used to make a standard curve and quantify the activity.

Materials

The following enzymes are used throughout the examples:

TL1: Trypsin-like peptidase from *Fusarium oxysporum* having the sequence of SEQ ID NO: 1.

Lysine-specific peptidase: Lysine-specific endopeptidase from *Achromobacter lyticus* having the sequence of SEQ ID NO: 13.

Glutamyl-specific peptidase: glutamyl-specific endopeptidase from *Bacillus licheniformis* having the sequence of SEQ ID NO: 14.

Galaya Enhance: Phospholipase A1 from *Fusarium venenatum* having the sequence of SEQ ID NO: 15.

Example 1

Production of High-Protein (6%) Stirred Soy-Yogurt in Laboratory Scale

Commercial, non-sweetened soymilk was purchased from local supermarket and fortified with a commercial soy protein isolate until a protein content of 6 wt % protein, which was used as base for production of soy-yogurt. The soy suspension was homogenized (500 bar), pasteurized (90° C. for 10 min), and subsequently cooled (43° C.). A commercial dairy starter culture (0.4 U/kg), sucrose (1 wt %), yeast extract (0.045 wt %), and TL1 were added, and fermentation carried out (43° C. for 4-6 hours), until the pH reached 4.5.

TL1 was dosed at 0, 20, 200, 400 or 600 KPRU/kg protein.

After ended fermentation, the soy-yogurt gel was broken using a shear mixer (Ultra Turrax, IKA, Germany) until smoothened (0-300 sec). The soy-yogurt was stored refrigerated until evaluation after 1 week.

The soy-yoghurts were analyzed according to common industry practices:

Viscosity was measured using Rapid Visco Analyzer (RVA) 4500 (Perten Instruments, Sweden). 30 g yogurt sample was transferred in RVA cup and allowed to set in the refrigerator for 1 h before the measurement. The measurement was carried out at 20° C. at 50 rpm and the viscosity value read after 70 seconds Forced syneresis test was conducted on 30 g of yogurt sample by centrifugation for 15 min at 2643×g. The weight of remaining solid is recorded after removal of supernatant, and amount of expelled liquid, called Syneresis, is calculated using the formula: (Weight of yogurt sample−weight of solid phase)/(weight of yogurt sample)*100% (given in wt %). Water-holding capacity=100%−Syneresis.

Additionally, the visual appearance of the soy-yogurt samples was evaluated by placing yogurt sample on the back side of black plastic spoons, where lumps or graininess and runny/thin texture are easily observed. The results are summarized in Table 1.

TABLE 1

Soy-yogurt properties after 1-week storage.

| Sample ID | Fermentation time (h) | Viscosity (cP) | Syneresis (wt %) | Visual appearance |
|---|---|---|---|---|
| Reference (Soy yogurt 6%) | 5.3 | 5,502 | 31.4 | Grainy, lumpy, thickest |
| Soy yogurt + TL1 (20) | 4.9 | 5,465 | 29.2 | Grainy, lumpy, thick |
| Soy yogurt + TL1 (200) | 4.0 | 3,304 | 27.3 | Shiny, smooth, no lumps |
| Soy yogurt + TL1 (400) | 4.0 | 2,398 | 23.1 | Shiny, smooth, less viscous |
| Soy yogurt + TL1 (600) | 3.8 | 2,118 | 21.1 | Shiny, smooth, least viscous |

The reference soy-yogurt prepared using no enzyme had the longest fermentation time of 5.3 h. Addition of TL1 resulted in faster fermentations, around 1 h shorter.

The reference soy-yogurt prepared using no enzyme had a high viscosity of 5,502 cP. Addition of TL1 resulted in a continuous decrease in viscosity with increasing enzyme dose, down to 2,118 cP or a viscosity reduction of more than 60%.

The reference soy-yogurt prepared using no enzyme had a high level of syneresis of 31.4 wt %. Addition of TL1 resulted in a continuous decrease in viscosity with increasing enzyme dose, down to 21.1 wt %.

The reference soy-yogurt prepared using no enzyme had a grainy, lumpy, and solid appearance. Addition of TL1 resulted in an improvement of the appearance and at certain dosage levels were smooth without visible graininess.

Addition of endoprotease TL1 resulted in overall best yoghurt properties, evaluated by several parameters: The soy-yogurts prepared with TL1 had a smoother texture than those prepared without. Interestingly, TL1 lowered both the amount of syneresis and the level of viscosity—which are otherwise often inversely correlated. An additional benefit is a faster fermentation time.

Example 2

Production of High-Protein (9%) Stirred Soy-Yogurt in Laboratory Scale

This example demonstrates the applicability of TL1 in soy-yoghurts with even higher protein contents than in Example 1: Commercial, non-sweetened soymilk, purchased from local supermarket, fortified with a commercial soy protein isolate until a protein content of 9% protein, was used as base for soy-yogurt production, as described in Example 1.

TL1 was dosed 0, 40, 200, 500, or 800 KPRU/kg protein. After ended fermentation, the soy-yogurt gel was broken using a shear mixer (Ultra Turrax, IKA, Germany) until smoothened (0-300 sec). The soy-yogurts were stored refrigerated until evaluation after 1 week.

Viscosity, forced syneresis test and visual appearance of the soy-yogurt samples were evaluated according to protocols described in Example 1. The results are summarized in Table 2.

TABLE 2

Soy yogurt properties after 1-week storage.

| Sample ID | Fermentation time (h) | Viscosity (cP) | Syneresis (wt %) | Visual appearance |
|---|---|---|---|---|
| Reference (Soy yogurt 9%) | 5.9 | 13,752 | 20.2 | Grainy, lumpy, solid |
| Soy yogurt + TL1 (40) | 5.9 | 12,386 | 19.4 | Grainy, lumpy, firm |
| Soy yogurt + TL1 (200) | 5.2 | 10,030 | 18.3 | Thick, Smooth |
| Soy yogurt + TL1 (500) | 5.2 | 6,896 | 13.8 | Smoother, creamy |
| Soy yogurt + TL1 (800) | 5.3 | 5,944 | 11.3 | Smoothest, creamy |

The reference soy-yogurt prepared using no enzyme had the longest fermentation time of 5.9 h, the highest viscosity of 13,752 cP, and highest level of syneresis of 20.2 wt %. The reference soy-yogurt was very firm and grainy.

Addition of TL1 resulted in slightly faster fermentation rates, and a significant, continuous decrease in viscosity (to 5,944 cP or close to 60% viscosity reduction) and syneresis (to 11.3 wt %). Further, the enzymatic treated soy-yogurts were visually more appealing, as the lumpiness disappeared and texture became smooth, shiny and softer.

Example 3

Production of High-Protein Yogurt in Laboratory Scale from 10% Pea Protein Hydrolysate This example demonstrates the applicability of TL1 a) in other legume yoghurts, exemplified by pea, and b) as a pre-treatment before fermentation: Commercial pea protein isolate was used as base for pea-yogurt production. The pea protein suspension was homogenized (800 bar), pasteurized (90° C. for 10 min), and subsequently cooled (45° C.). TL1 was dosed at 0, 100, or 450 KPRU/kg protein and incubated overnight (16 h at 45° C.), before heat inactivation (90° C. for 10 min). A commercial dairy starter culture (0.2 U/kg) and sucrose (1 wt %) was added, and fermentation carried out (43° C. for 4-20 hours), until the pH reached 4.5.

After ended fermentation, the pea-yogurt gel was broken using a shear mixer (Ultra Turrax, IKA, Germany) until smoothened (0-300 sec). The yogurt was stored refrigerated until evaluation after 4 days.

Viscosity, forced syneresis test and visual appearance of the pea-yogurt samples were evaluated according to protocols described in Example 1. The degree of hydrolysis was determined spectrophotometrically (340 nm) from the formed complexes of o-phthaldialdehyde and the free α-amino groups generated during proteolysis (given as difference from unhydrolyzed pea protein). The results are summarized in Table 3.

TABLE 3

Soy yogurt properties after 4 days of storage.

| Sample ID | ΔDegree of hydrolysis | Viscosity (cP) | Syneresis (wt %) | Visual appearance |
|---|---|---|---|---|
| Reference (Pea yogurt 10%) | 0 | 11,967 | 19 | Grainy, lumpy, solid |
| Pea yogurt + TL1 (100) | 2.9 | 3,430 | 12 | Shiny, smooth, no lumps |
| Pea yogurt + TL1 (450) | 3.4 | 2,973 | 9 | Shiny, smooth, thinnest |

The reference pea-yogurt prepared using no enzyme had the longest fermentation time (data not shown), the highest viscosity (11,967 cP), and highest level of syneresis (19 wt %). The reference pea-yogurt was very firm and grainy (see also FIG. 1).

Figure 2:
FIG. 2 shows the visual appearance of pea-yogurt 10% with 100 KPRU TL1 (from Example 3)
Figure 3:
FIG. 3 shows the visual appearance of pea-yogurt 10% with 450 KPRU TL1 (from Example 3)

Pre-treatment of pea protein isolate with TL1 at 100 or 450 KPRU/kg protein caused an increased degree of hydrolysis of 2.9 and 3.4, respectively. The yogurts produced from the pea protein hydrolysates had significantly lower viscosities (to 2,973 cP) and less syneresis (to 9 wt %). Further, the enzymatic treated pea-yogurts were visually more appealing, as the lumpiness disappeared and texture became smooth, shiny and softer, as is evident from the images (see also FIG. 2 and FIG. 3).

Example 4

TL1 Effect in Fermentation of a Pea-Based Yogurt

Here a pea yogurt made from pea isolate and rape seed oil was made where TL1 was added together with the culture showing that a protease treatment can be done before pasteurization of a fermentation base (as in Example 3) or in the fermentation step.

A commercial pea protein isolate (80% protein) was mixed with water, refined rape seed oil, sugar and peptone to a fermentation base containing 3.5% protein, 1.5% fat, 1% sucrose and 0.2 g/L peptone. The fermentation base was homogenized at 300 bar and pasteurized for 10 min at 90° C. and then cooled to 43° C. before TL1 at 200 KPRU/kg protein and a starter culture was added. Fermentation and post fermentation treatment was done as in Example 1. Analysis of the yogurts was performed as in Example 1.

TABLE 4

Yogurt characteristics based on the average of two individual yogurt samples

| Sample ID | TL1 dose (KPRU/kg protein) | Fermentation time (h) | Viscosity (cP) | Syneresis (wt %) |
|---|---|---|---|---|
| Pea yogurt | 0 | 6.7 | 1060 | 42 |
| TL1 treated pea yogurt | 200 | 6 | 280 | 39 |

The product made in this example resembled a drinking yogurt with low viscosity and showed that TL1 had the ability of reducing viscosity significantly without destroying the stability of the product. In fact, just as seen in other examples the syneresis in the protease treated drinking yogurt was lower than for the untreated pea yogurt. The examples in pea also demonstrate that protease can be added either in fermentation or in a pretreatment step before pasteurization.

Example 5

Dose Response in Commercial Soy Beverage 3.7% Protein for a Stirred Fermented Product Commercial, non-sweetened soymilk was purchased from local supermarket and 0.4% sucrose added before pasteurization (95° C. 8 min) followed by cooling to 43° C. Protease and yogurt starter (Yoflex L811) culture was added at the same time. The pH was monitored until the pH reached below pH 4.5 and the samples were treated post fermentation as in Example 1.

TL1 was tested at 20, 40, 100, 200, 300, 400 and 500 KPRU/kg. The glutamyl-specific peptidase was tested at 0.01, 0.1, 0.5, 1, 5, 10, and 20 mg EP (Enzyme Protein)/kg soy protein and the lysine-specific peptidase was tested at 2 and 25 mg EP/kg soy protein. All samples were made in duplicates and the average value of these two individual yogurts are reported.

Viscosity and forced syneresis test of the yogurt samples were evaluated according to Example 1. The results are summarized in Tables 5-7. A commercial dairy yogurt with 1.5% fat was also included in the viscosity and syneresis analysis for comparison.

TABLE 5

Characteristics of stirred yogurts treated with TL1

| Sample ID | TL1 dose (KPRU/kg protein) | Fermentation time (h) | Viscosity (cP) | viscosity reduction (%) | Syneresis (wt %) |
|---|---|---|---|---|---|
| Reference (Soy yogurt 3.7%) | 0 | 5.3 | 1530 | — | 33 |
| Soy yogurt | 20 | 5.2 | 1480 | 3 | 33 |
| Soy yogurt | 40 | 4.9 | 1430 | 7 | 32 |
| Soy yogurt | 100 | 4.8 | 1355 | 11 | 33 |
| Soy yogurt | 200 | 4.6 | 1241 | 19 | 32 |
| Soy yogurt | 300 | 4.3 | 1101 | 28 | 32 |
| Soy yogurt | 400 | 4.1 | 1013 | 34 | 30 |
| Soy yogurt | 500 | 4.1 | 777 | 49 | 27 |
| Dairy yogurt 1.5% fat | — | — | 1100 | | 60 |

TABLE 6

Characteristics of stirred yogurts treated with glutamyl-specific peptidase

| Sample ID | glutamyl-specific peptidase dose (mg EP/kg protein) | Fermentation time (h) | Viscosity (cP) | Viscosity reduction (%) | Syneresis (wt %) |
|---|---|---|---|---|---|
| Reference (Soy yogurt 3.7%) | 0 | 5.3 | 1520 | — | 32 |
| Soy yogurt | 0.01 | 5.2 | 1490 | 2 | 30 |
| Soy yogurt | 0.1 | 5.0 | 1430 | 6 | 32 |
| Soy yogurt | 0.5 | 4.8 | 1381 | 9 | 31 |
| Soy yogurt | 1 | 4.4 | 1250 | 18 | 30 |
| Soy yogurt | 5 | 4.5 | 900 | 41 | 28 |
| Soy yogurt | 10 | 4.5 | 700 | 54 | 30 |
| Soy yogurt | 20 | 4.6 | 590 | 61 | 32 |

TABLE 7 characteristics of stirred yogurts treated with lysine-specific peptidase

| Sample ID | lysine-specific peptidase dose (mg EP/kg protein) | Fermentation time (h) | Viscosity (cP) | Viscosity reduction (%) | Syneresis (wt %) |
|---|---|---|---|---|---|
| Reference (Soy yogurt 3.7%) | 0 | 5.7 | 1250 | — | 32 |
| Soy yogurt | 2 | 5.4 | 1205 | 4 | 33 |
| Soy yogurt | 25 | 4.5 | 925 | 26 | 28 |

Compared to a commercial dairy yogurt comprising 3.5% protein and 1.5% fat, the viscosity measurements of the control soy yogurts showed a significantly higher viscosity at a similar protein content (Table 5). All tested proteases had a dose dependent reduction on viscosity of the soy yogurts. They also showed a potential to reduce fermentation time. Protease treatment also had a weak positive impact on the amount of syneresis. This allows tailoring the viscosity of a soy yogurt to fit the desired product and to make the final viscosity more dairy-like.

Example 6

Dose Response in Commercial Soy Beverage Fortified with Soymilk Powder to a Final Concentration of 8% Protein for a Stirred Fermented Product Commercial, non-sweetened soymilk was purchased from local supermarket and fortified by addition of a commercial soymilk powder to a final protein concentration of 8%. The beverage was mixed at room temperature for 5 min and sucrose (0.8%) and yeast extract (0.045% to speed up fermentation) was added and the mix was agitated for 20 min. The beverage was then pasteurized (95° C. 5 min) before being cooled to 43° C. Protease and yogurt starter (Yoflex L811) culture was added at the same time and the beverage was held at 43° C. The pH was monitored and until it reached below pH 4.5 and the samples were treated post fermentation as in Example 1.

TL1 was tested at 200 and 400 KPRU/kg. The glutamyl-specific peptidase was tested at 2 and 4 mg EP/kg soy protein and the lysine-specific peptidase was tested at 25 and 50 mg EP/kg soy protein. All samples were made in duplicates and the average value of these two individual yogurts are reported.

Viscosity and forced syneresis test of the yogurt samples were evaluated according to Example 1. The results are summarized in Table 8.

TABLE 8

Characteristics of finished stirred yogurts using various specific proteases in a high protein fermented soy product

| Sample ID | Fermentation time (h) | Viscosity (cP) | Syneresis (wt %) | Comment |
|---|---|---|---|---|
| Reference (Soy yogurt 9%) | 8.0 | 10800 | 18 | Grainy texture and doesn't resemble a yogurt |
| Soy yogurt TL1 (200 KPRU/kg protein) | 6.9 | 7730 | 14 | Smoother than reference but not perfectly smooth |
| Soy yogurt TL1 (400 KPRU/kg protein) | 6.4 | 6530 | 10 | Smoothest sample |
| Soy yogurt glutamyl-specific peptidase (2 mg EP/kg) | 6.9 | 9650 | 14 | Smoother than reference but not perfectly smooth |
| Soy yogurt glutamyl-specific peptidase (4 mg EP/kg) | 6.9 | 8403 | 15 | Smoother than reference but not perfectly smooth |
| Soy yogurt lysine-specific peptidase (25 mg EP/kg) | 6.4 | 9370 | 12 | Smoother than reference but not perfectly smooth |
| Soy yogurt lysine-specific peptidase (50 mg EP/kg) | 6.4 | 7820 | 10 | Much smoother than reference |

At the higher protein content of 8%, the blank sample is very grainy and does not resemble a yogurt product. All three proteases tested had the capacity to reduce the graininess and make a smoother soy yogurt. The proteases treated yogurts also had shorter fermentation time and a lowered viscosity of the final stirred yogurt. Protease treatment also has a positive impact on the structure making the soy yogurts smoother and reducing syneresis.

The data in these examples clearly shows that proteases can be used to improve legume-based yogurts exemplified by soy and pea, not only by reducing viscosity but also by making a smoother product and reducing syneresis. The proteases also show processing benefits by reducing the fermentation time which could be used to increase the production capacity and reduce the risk of contamination since the yogurts are exposed for a shorter time to neutral pH and raised temperatures.

Example 7

Sensory Evaluation of TL1 and Lipase in High Protein Soy Yogurts

Commercial, non-sweetened soymilk was purchased from local supermarket and fortified by addition of commercial soymilk powder to a final protein concentration of 8%. The beverage was mixed at room temperature for 5 min and sucrose (0.8%) and yeast extract (0.045% to speed up fermentation) was added and the mix was kept with agitation for 20 min. In samples treated with a phospholipase product, Galaya Enhance (3800 EEU/g) was added at a dose of 0.01% weight/volume before pasteurization and it was incubated for 30 min before pasteurization at 40° C. The beverage was then pasteurized (95° C. 5 min) before being cooled to 43° C. Peptidase and yogurt starter culture (ABY-3) was added at the same time and the beverage was held at 43° C. The pH was monitored until it reached below pH 4.5 and the samples were treated post fermentation as in Example 1.

A sensory evaluation was performed according to the description below:

Sensory Evaluation of Plant-Based Yoghurt Alternatives

Initial stir. A spoon was used to stir the sample for one round and then turned. Samples are scored from 1—grainy and separated to 7—smooth and coherent.

Amount of stir. Samples are stirred to full stir and the amount of stir was scored from: 1—required a lot of stirring to 7—samples quickly became smooth.

Full stir. Samples are scored from 1—grainy, matte to 7—smooth, glossy

Astringency: 1—very astringent, 7—not astringent

Acidity: 1—very sour, 7—low acidity

Bitterness: 1—very bitter, 7—not bitter

Mouthfeel: 1—watery, 7—rich and creamy

Preference: Samples are ranked based on preference and panelist are asked to de-scribe why they ranked the samples in the order they did.

The sensory panel consisted of untrained panelists and in the sensory evaluations each panelist was given four anonymous samples per tasting session. They were asked to give all samples a score on several parameters both by visual inspection as well as from tasting the samples. Finally, the panelists were asked to rank the samples based on preference and comment on why they preferred the sample they did.

TABLE 9

Analytical results of the yogurts used for sensory evaluation

| Sample ID | Fermentation time (h) | Viscosity (cP) | Syneresis (wt %) |
|---|---|---|---|
| Reference (Soy yogurt 8%) | 6.8 | 9330 | 20 |
| Soy yogurt TL1 (300 KPRU/kg protein) | 5.8 | 6063 | 16 |
| Soy yogurt (0.01% Galaya Enhance) | 6.7 | 8840 | 19 |
| Soy yogurt TL1 (300 KPRU/kg protein) + 0.01% Galaya Enhance | 6.2 | 6551 | 14 |

TABLE 10

Preference scores based on overall sensory in set containing TL1 and Galaya Enhance. Number of panelists n = 6

| | Number of panelists ranking it in a certain preference | | | |
|---|---|---|---|---|
| Sample ID | Most preferred sample | $2^{nd}$ most preferred sample | $2^{nd}$ least preferred sample | Least preferred sample |
| Reference (Soy yogurt 8%) | 0 | 0 | 5 | 1 |
| Soy yogurt TL1 (300 KPRU/kg protein) | 1.5 | 4.5 | 0 | 0 |
| Soy yogurt (0.01% Galaya Enhance) | 0 | 0 | 1 | 5 |
| Soy yogurt TL1 (0.01% Galaya Enhance + 300 KPRU/kg soy protein) | 4.5 | 1.5 | 0 | 0 |

TABLE 11

Visual evaluation of first sensory set: TL1 and Galaya Enhance

| | Average score | | |
|---|---|---|---|
| Sensory parameter | Initial stir | Amount of stir | Full stir |
| Reference (Soy yogurt 8%) | 1.2 ± 0.4 | 1.8 ± 1 | 2.2 ± 1 |
| Soy yogurt TL1 (300 KPRU/kg protein) | 4.3 ± 1.6 | 5.3 ± 1.2 | 5.5 ± 1 |
| Soy yogurt (0.01% Galaya Enhance) | 2.5 ± 0.8 | 3.2 ± 1.3 | 2.5 ± 1.2 |
| Soy yogurt TL1 (0.01% Galaya Enhance + 300 KPRU/kg soy protein) | 5.3 ± 1.2 | 6.2 ± 1 | 5.7 ± 1 |

TABLE 12

Taste evaluation of first sensory set: TL1 and Galaya Enhance

| | Average score | | | |
|---|---|---|---|---|
| Sensory parameter | Astringency | Acidity | Bitterness | Mouthfeel |
| Reference (Soy yogurt 8%) | 2.2 ± 1.2 | 4.5 ± 1.6 | 5.2 ± 1.5 | 3.7 ± 0.8 |
| Soy yogurt TL1 (300 KPRU/kg protein) | 4.7 ± 1.9 | 5.0 ± 1.3 | 5.5 ± 1 | 6 ± 1.1 |
| Soy yogurt (0.01% Galaya Enhance) | 2.8 ± 1.3 | 4.7 ± 1.5 | 5.2 ± 1.5 | 3.7 ± 1.4 |
| Soy yogurt TL1 (0.01% Galaya Enhance + 300 KPRU/kg protein) | 5.3 ± 2.1 | 4.5 ± 1.9 | 5.8 ± 1 | 5.3 ± 1.5 |

At 8% protein it was apparent that the structural defects were primarily solved by the addition of a TL1. Not only did TL1 lower the viscosity of the soy yogurts but more importantly TL1 improved all three sensory parameters related to the visual appearance of the yogurts. "Initial stir" relates to the early homogeneity of the product, "amount of stir" relates to the difficulty to stir the yogurt and "full stir" to how appealing the visual product was, once completely stirred. These attributes correspond to the first impression a consumer would have when opening a soy yogurt and spoon it from the package and the TL1 had a significant positive impact on all three parameters. However, peptidases are known to create bitter off notes when hydrolyzing proteins. In the sensory evaluation there was no difference in bitterness between the peptidase treated samples compared to control. The peptidase also improved some of the in-mouth aspects of the soy yogurts such as reduced astringency and improved mouthfeel.

Surprisingly, the Galaya Enhance treated soy yogurt was the least preferred sample (5 out of 6 panelists) in the set with TL1 and Galaya Enhance and while the differences between TL1 and the combination was relatively small in the sensory evaluation there was a clear preference for the combination in the preferred samples ranking (4.5 out of 6 panelists preferred the combination). The comments connected to the preference related to a creamy and smooth texture and that it was the most appealing looking sample.

Example 8

Sensory Evaluation of Glutamyl-Specific Peptidase in High Protein Soy Yogurts

Commercial, non-sweetened soymilk was purchased from local supermarket and fortified by addition of commercial soymilk powder to a final protein concentration of 8%. The beverage was mixed at room temperature for 5 min and sucrose (0.8%) and yeast extract (0.045% to speed up fermentation) was added and the mix was kept with agitation for 20 min. The beverage was then pasteurized (95° C. 5 min) before being cooled to 43° C. Peptidase and yogurt starter culture (ABY-3) was added at the same time and the beverage was held at 43° C. The pH was monitored until it reached below pH 4.5 and the samples were treated post fermentation as in Example 1.

A sensory evaluation was performed according to Example 7. The sensory panel consisted of untrained panelists and in the sensory evaluations each panelist was given four anonymous samples per tasting session. They were asked to give all samples a score on several parameters both by visual inspection as well as from tasting the samples. Finally, the panelists were asked to rank the samples based on preference and comment on why they preferred the sample they did.

TABLE 13

Analytical results of the yogurts used for sensory evaluation

| Sample ID | Fermentation time (h) | Viscosity (cP) | Syneresis (wt %) |
|---|---|---|---|
| Reference (Soy yogurt 8%) | 6.8 | 9330 | 20 |
| Soy yogurt glutamyl-specific peptidase (8 mg EP/kg soy protein) | 6.3 | 6417 | 13 |

TABLE 14

Visual evaluation of glutamyl-specific peptidase

| | Average score | | |
|---|---|---|---|
| Sensory parameter | Initial stir | Amount of stir | Full stir |
| Reference (Soy yogurt 8%) | 1.8 ± 1.3 | 2.2 ± 1.3 | 2.1 ± 1.1 |
| Soy yogurt (glutamyl-specific peptidase 8 mg EP/kg soy protein) | 4.6 ± 1.8 | 5.2 ± 1.1 | 5.7 ± 0.8 |

TABLE 15

Taste evaluation of glutamyl-specific peptidase

| | Average score | | | |
|---|---|---|---|---|
| Sensory parameter | Astringency | Acidity | Bitterness | Mouthfeel |
| Reference (Soy yogurt 8%) | 3.5 ± 2.1 | 5.7 ± 1.1 | 5.2 ± 1.6 | 2.6 ± 1.5 |
| Soy yogurt (glutamyl-specific peptidase 8 mg EP/kg soy protein) | 6.2 ± 0.8 | 4.4 ± 1.4 | 5.3 ± 1.3 | 6.6 ± 0.5 |

TABLE 16

Preference scores based on overall sensory in sample treated with glutamyl-specific peptidase. Number of panelists n = 7

| Sample ID | Most preferred sample | Least preferred sample |
|---|---|---|
| Reference (Soy yogurt 8%) | 0 | 7 |
| Soy yogurt (glutamyl-specific peptidase 8 mg EP/kg soy protein) | 7 | 0 |

Like in Example 7, with TL1, the samples treated with glutamyl-specific peptidase solved many of the negative aspects caused by the high protein content. The viscosity of the TL1 treated yogurt and the glutamyl-specific peptidase were also close to each other. Glutamyl-specific peptidase treated high protein soy yogurts also showed similar improvements in the visual evaluation (Table 14) and reduced astringency while increasing mouthfeel without generating any bitterness (Table 15). Form a production point of view, the shortened fermentation time was seen again (Table 13). In the preference data (Table 16) all panelists preferred the glutamyl-specific peptidase treated samples mentioning that it looked better and had a smoother texture and was without a floury mouthfeel.

Example 9

Effects of TL1 and Galaya Enhance on High Protein Soy (7%) Stirred Yoghurt Via Texture Analyzer Parameters Including a New Parameter: Stirring Cohesiveness Texture of yoghurt can be measured by sensory and instrument analysis. Texture Analyzer (TA) is well used for measuring texture of food products. The parameters measured by TA are defined according to measurement conditions and subjected food categories. In our previous studies, we found thickness extracted from Texture Analyzer correlated well with viscosity measured by Rapid Visco Analyzer (RVA) and stirring cohesiveness extracted from Texture Analyzer correlated well with homogeneity measured by sensory. Stirring cohesiveness is a new identified parameter. We also found optimal dosage of TL1, and its combination with Galaya Enhance in other studies (Example 1, 2 and 7). The objective of this example was to demonstrate effects of TL1, Galaya Enhance and their combination on thickness and homogeneity via stirring cohesiveness and thickness measured by Texture Analyzer (TA) as well as Rapid Visco Analyzer (RVA) and visual evaluation.

Commercial soybean milk (Naturli', no sugar added version, protein content 3.7%) was preheated to 55° C. Soybean milk powder was added into the preheated soybean milk for obtaining soybean milk base with protein content at 7%. The enriched soybean milk was subsequently kept at 55° C. for 30 minutes. The enriched soybean milk was then divided into two portions. Sucrose and yeast extract were then added at 0.4% (w/w) and 0.02% (w/w) respectively into one portion of the enriched soybean milk base. This portion was heated up to 90° C. and maintained at temperature for 10 minutes. The other portion of soybean milk was cooled down to 40° C. and Galaya Enhance was added at 0.52 EEU/g based on soybean milk weight. After 30 minutes incubation, the Galaya Enhance treated portion was subjected to the same addition of sucrose and yeast extract and heat treatment (90° C. for 10 minutes) as non-enzyme treated portion. The two portions of heat-treated soybean milk were cooled down and stored under 5° C. as high protein (7%) soybean yoghurt fermentation base.

Soybean yoghurt fermentation base (protein content 7%) was preheated to 43° C. Protease TL1 and starter culture (YF-L811, Chr. Hansen, Denmark) was subsequently added into fermentation base and stirred for 2 minutes. The final enzyme treatment of each sample is listed in Table 17. Fermentation was kept at 43° C. Coagulated yoghurt gel was stirred by high shear mixer (Ultra Turrax, IKA, Germany) at 9000 rpm for approximately 40 seconds when pH dropped around 4.45. Approximately 80 g of the yoghurt was kept in one closed plastic jar of 100 ml. The yoghurt samples were stored under 5° C. for 8 days before evaluation.

TABLE 17

Enzyme treatment in example 9. Galaya Enhance is abbreviated GE in the table

| Sample ID | Protease TL1 dosage, KPRU/g soybean protein | Galaya Enhance, EEU/g yoghurt fermentation base |
|---|---|---|
| TL1 0.4 | 0.4 | 0 |
| GE 0.52 | 0 | 0.52 |
| TL1 0.4 + GE0.52 | 0.4 | 0.52 |
| Blank control | 0 | 0 |

*Phospholipase Galaya Enhance was dosed at pretreatment step (40° C., 30 min) and denatured by heat treatment. Protease TL1 was dosed at fermentation step.

The stored yoghurt was measured on Texture Analyzer (TA.XT plus, Stable Micro System, UK) equipped with a 25 mm diameter acrylic cylinder probe. The yoghurt was measured immediately after it was taken out from 5° C. storage condition. Adjusted Texture Profile Analysis (TPA) procedure was carried out at pretest speed 2 mm/s, test speed 2 mm/s, waiting time 5 s and posttest speed 5 mm/s. Thickness (positive area integrated to peak force during first compression), adhesiveness (negative area between two compressions) and stirring cohesiveness (adhesiveness divided by thickness) were calculated. The higher value of stirring cohesiveness, the higher homogeneity would be obtained after stirring due to higher cohesiveness during stirring. Measures were performed with duplicated samples.

Viscosity measurement was performed as in Example 1.

Visual evaluation was performed by an experienced technician following a standard procedure established for evaluating plant-based protein yoghurt. The evaluated parameters are syneresis, initial homogeneity, adhesiveness, and homogeneity after stirring. A score system from 1 to 7 was used to distinguish samples on each parameter. The definitions of visual evaluated parameters defined here are:

Syneresis—the water amount observed once the plastic jar is opened

Initial homogeneity—the homogeneity of yoghurt after it is flipped from the bottom of the plastic jar by a spoon Homogeneity after stirring—the homogeneity after the whole sample in the plastic jar is stirred 30 times manually by a spoon Adhesiveness—the amount and shape of yoghurt sample on the back of a spoon after the spoon is pressed and lifted quickly on the surface of fully stirred yoghurt sample The yoghurts treated with TL1 (0.4 KPRU/g protein) turned to be thinner and less adhesive compared to blank control. The yoghurts had increased stirring cohesiveness which indicated a better homogeneity. The yoghurts treated with Galaya Enhance (0.52 EEU/g yoghurt fermentation base) turned to be thicker and more adhesive compared to blank control. The yoghurts had reduced stirring cohesiveness which indicated an inferior homogeneity. The yoghurts treated with the combination of the two enzymes had thicker and more adhesive texture compared to the yoghurts with single TL1. Surprisingly, stirring cohesiveness of these yoghurts was also higher than that of yoghurts with only TL1, which indicates homogeneity was further improved.

TABLE 18

Texture analyzer data from stirred yoghurts. Galaya Enhance is abbreviated GE in the table

| TA parameters | Sample ID | Mean | Std Dev |
|---|---|---|---|
| thickness | GE0.52 | 177.53 | |
| | blank control | 162.71 | 6.00 |
| | TL1 0.4 + GE0.52 | 133.32 | 5.68 |
| | TL1 0.4 | 117.00 | 8.98 |
| Adhesiveness | GE0.52 | 114.44 | |
| (index of viscosity) | blank control | 111.83 | 1.86 |
| | TL1 0.4 + GE0.52 | 104.62 | 0.79 |
| | TL1 0.4 | 89.32 | 8.30 |
| stirring cohesiveness | TL1 0.4 + GE0.52 | 79% | 4% |
| | TL1 0.4 | 76% | 1% |
| | blank control | 69% | 4% |
| | GE0.52 | 64% | |

TL1 (0.4 KPRU/g protein) reduced viscosity obviously. Galaya Enhance (0.52 EEU/g yoghurt fermentation base) increased viscosity. The combination of these two enzymes still reduced viscosity obviously compared to blank control.

TABLE 19

Viscosity of stirred yoghurts. Galaya Enhance is abbreviated GE in the table

| Sample ID | Viscosity, cP |
|---|---|
| TL1 0.4 | 2238 |
| GE 0.52 | 3953 |
| TL1 0.4 + GE 0.52 | 2787 |
| blank control | 3560 |

There was no syneresis noticed from all samples after 8 days storage even on samples having low viscosity (sample ID: TL1 0.4, TL1 0.4+GE0.52). Both initial homogeneity and homogeneity after stirring were improved by TL1 (0.4 KPRU/g protein). Galaya Enhance (0.52 EEU/g yoghurt fermentation base) reduced initial homogeneity which means that intact samples after storage looked less homogeneous than blank control. However, the same yoghurt sample did not show inferiority on homogeneity after stirring. The combination of GE (0.52 EEU/g yoghurt fermentation base) with TL1 (0.4 KPRU/g protein) even further improved homogeneity after stirring compared to yoghurt with TL1 alone. This indicates Galaya Enhance had effect on microstructure of yoghurts.

TABLE 20

Visual evaluation of stirred yoghurts. Galaya Enhance is abbreviated GE in the table

| | syneresis (1 low-7 high) | initial homogeneity (1 low-7 high) | adhesiveness (1 low-7 high) | homogeneity after stirring (1 low-7 high) |
|---|---|---|---|---|
| TL1 0.4 | 1 | 6 | 4 | 6 |
| GE 0.52 | 1 | 2 | 5 | 3 |

TABLE 20-continued

Visual evaluation of stirred yoghurts. Galaya Enhance is abbreviated GE in the table

| | syneresis (1 low-7 high) | initial homogeneity (1 low-7 high) | adhesiveness (1 low-7 high) | homogeneity after stirring (1 low-7 high) |
|---|---|---|---|---|
| TL1 0.4 + GE 0.52 | 1 | 6 | 5 | 6.5 |
| blank control | 1 | 3 | 6 | 3 |

The enzyme effects highlighted in this example are

- Compared to blank control, TL1 alone (0.4 KPRU/g protein) increased homogeneity while reduced thickness, adhesiveness and viscosity.
- Compared to blank control, Galaya Enhance alone (0.52 EEU/g yoghurt fermentation base) increased thickness, adhesiveness and viscosity while it reduced homogeneity of high protein (7%) soy stirred yoghurt.
- Compared to TL1 alone, a combination of TL1 (0.4 KPRU/g protein) and Galaya Enhance (0.52 EEU/g yoghurt fermentation base) surprisingly further improved homogeneity and increased thickness of high protein (7%) soy stirred yoghurt.

Example 10

Effects of TL1 and Galaya Enhance on High Protein (7%) Soy Set Yoghurt

The objective of this example was to demonstrate effects of TL1, Galaya Enhance and their combination on high protein soy yoghurt via measures of Texture Analyzer and visual evaluation.

Yoghurt was made as in Example 9 up to fermentation. The yoghurts were fermented directly in closed plastic jars. The yoghurts were transferred directly to storage condition (5° C.) instead of being stirred, when the targeted pH range was observed. The yoghurt samples were stored at 5° C. for 8 days before evaluation.

TABLE 21

Enzyme treatment in example 10. Galaya Enhance is abbreviated GE in the table

| Sample ID | Protease TL1 dosage, KPRU/g soybean protein | Galaya Enhance, EEU/g yoghurt fermentation base |
|---|---|---|
| TL1 0.4 | 0.4 | 0 |
| GE0.52 | 0 | 0.52 |
| TL1 0.4 + GE0.52 | 0.4 | 0.52 |
| Blank control | 0 | 0 |

*Phospholipase Galaya Enhance was dosed at pretreatment step (40° C., 30 min) and inactivated by heat. Protease TL1 was dosed in the fermentation step.

The stored yoghurt was measured on Texture Analyzer (TA.XT plus, Stable Micro System, UK) equipped with a 25 mm diameter acrylic cylinder probe. The yoghurt was measured immediately after it was taken out from 5° C. storage condition. Texture Profile Analysis (TPA) procedure was carried out at pretest speed 2 mm/s, test speed 1 mm/s, waiting time 5 s and posttest speed 5 mm/s. The following parameters were calculated:

- Fracturability, g—the force value of first breaking point greater than 0.5 g. The higher value, the more difficult for a yoghurt gel to break.

- Elasticity, g/mm—the ratio between force and distance at first breaking point. The higher value, the higher force is needed for the same extent of deformation of a yoghurt gel.
- Thickness, g·s—the value of positive area from the point probe starts compression to the point the probe finishes the first compression. The higher value, the thicker of a yoghurt gel.
- Adhesiveness, g·s—the absolute value of negative area between two compressions of the probe. The higher value, the more chance of a yoghurt sample to stick to another subject.
- Cohesiveness, %—the ratio between the two positive areas from the point probe starts compression to the point probe finishes compression. The higher value, the more chance of a yoghurt gel stays as a continuous body during compression
- Stirring cohesiveness, %—the ratio between adhesiveness and thickness. The higher value, the more chance of a yoghurt stays as a continuous body during repeating compressions Visual evaluation was performed by an experienced technician following a standard procedure established for evaluating plant-based protein yoghurt. The evaluated parameters are syneresis, shrinkage, flakiness, setting, firmness and cohesiveness. A score system from 1 to 7 was used to distinguish samples on each parameter. The definitions of visual evaluated parameters defined here are:

- Syneresis—the water amount observed once the plastic jar is opened
- Shrinkage—the gap between the body of yoghurt and plastic jar
- Flakiness—flakes on the surface of the yoghurt body
- Setting—the shape and its change of a spoon of yoghurt sample which is spooned out from the plastic jar and put it on the table
- Firmness—the force sensed by assessor when he/she uses back of a poon to press the spooned-out yoghurt sample on a table
- Cohesiveness—the deformation of macro-structure and integrity of the whole piece of yoghurt sample when the assessor uses back of a poon to press the spooned-out yoghurt sample on a table. The more difficult to be deformed and the higher integrity of the edge of the sample, the higher cohesiveness.
- Homogeneity—the homogeneity after spreading out the pressed yoghurt sample from evaluation of firmness and cohesiveness Compared to blank control, the yoghurt treated with TL1 (0.4 KPRU/g protein) was easier to break, less elastic, thinner and less adhesive. This yoghurt had higher value on normal cohesiveness and stirring cohesiveness. This texture profile indicates the yoghurt melts away easily and coat more evenly in mouth, but it is thin.

Compared to blank control, the yoghurt treated with Galaya Enhance (0.52 EEU/g yoghurt fermentation base) was slightly harder to break, more elastic, thicker and higher value on normal cohesiveness. While this yoghurt had less adhesiveness and lower value on stirring cohesiveness. This texture profile indicates a firm and unsmooth mouth feeling.

Compared to the yoghurt with TL1 alone, the yoghurt treated with the combination of the TL1 and Galaya Enhance needed higher stress to break and was thicker, more adhesive and cohesive. However, the elasticity reduced a lot. This texture profile indicates the yoghurt melts away very easily, coats mouth more smoothly while keeping a relative thick mouth feel.

TABLE 22

| Texture profile of high protein (7%) set soy yoghurt measured by texture analyzer. Galaya Enhance is abbreviated GE in the table | | | | | | |
|---|---|---|---|---|---|---|
| Sample ID | Fracturability g | Elasticity g/mm | Thickness g · s | Adhesiveness g · s | Cohesiveness | Stirring cohesiveness |
| TL0.04 | 109.55 | 93.71 | 941.21 | 428.46 | 40% | 46% |
| GE0.52 | 274.99 | 151.59 | 2035.42 | 650.68 | 38% | 32% |
| TL 0.04 + GE0.52 | 149.85 | 52.14 | 1063.73 | 514.98 | 43% | 48% |
| Blank control | 264.07 | 143.60 | 1750.92 | 702.17 | 35% | 40% |

Syneresis, shrinkage or flakiness was found in all yoghurt samples even on samples with single TL1.

Compared to blank control, the yoghurt with TL1 (0.4 KPRU/g protein) showed a little lower setting. During spoon pressing, this yoghurt was found softer but more cohesive and homogeneous. A spoon pressing is used to mimic pressing yoghurt with tongue in the sensory. Therefore, this visual evaluation also indicated a cohesive and smooth mouth feeling of this yoghurt.

Compared to blank control, the yoghurt with Galaya Enhance (0.52 EEU/g yoghurt fermentation base) showed the same setting as control. During spoon pressing, this yoghurt was found a little softer, more cohesiveness but had poor homogeneity. The reason for a softer gel during spoon pressing compared to the result of texture analyzer is due to no limited boundary for a sample to deform during the spoon pressing test.

Compared to the yoghurt with TL1 alone, the yoghurt treated with the combination of the TL1 and Galaya Enhance had higher setting, slightly firmer gel, higher cohesiveness and the same homogeneity. The combination was the one with highest cohesiveness according to the visual evaluation. This visual evaluation indicated that the yoghurt would coat mouth smoothly and would have relatively thicker mouth feeling.

Figure 4:
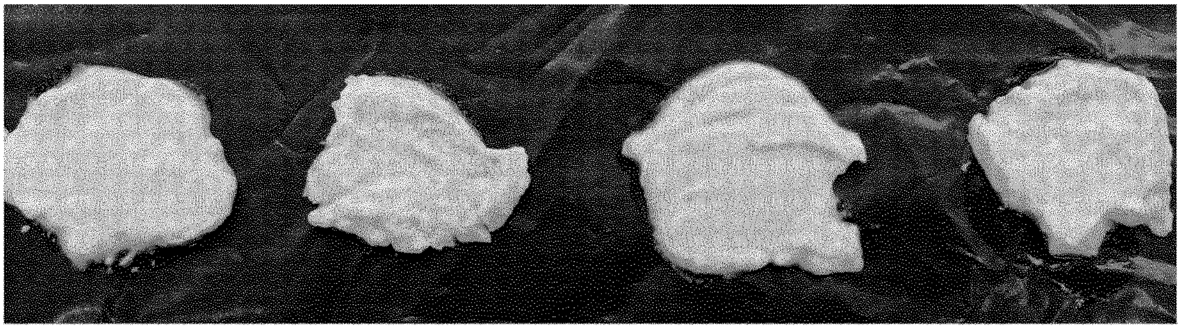
FIG. 4 shows the effects of TL1 and Galaya Enhance on soy set yoghurt 7% protein (from Example 10). From left to right is seen soy set yoghurt produced with TL1 0.4, GE 0.52, TL1 0.4+GE 0.52, Control.

This is further illustrated in FIG. 4.

TABLE 23

| Visual evaluation of set yoghurts. Galaya Enhance is abbreviated GE in the table | | | | | | | |
|---|---|---|---|---|---|---|---|
| Sample ID | Syneresis (1 low-7 high) | shrinkage (1 low-7 high) | flakiness (1 low-7 high) | setting (1 low-7 high) | firmness (1 low-7 high) | cohesiveness (1 low-7 high) | homogeneity (1 low-7 high) |
| TL0.4 | 0 | 0 | 0 | 6 | 4 | 6 | 7 |
| GE0.52 | 0 | 0 | 0 | 7 | 6 | 5 | 2 |
| TL 0.4 + GE0.52 | 0 | 0 | 0 | 7 | 4.5 | 7 | 7 |
| Blank control | 0 | 0 | 0 | 7 | 7 | 4 | 4 |

The enzyme effects highlighted in this example are

- Compared to blank control, high protein (7%) soy set yoghurt with TL1 alone (0.4 KPRU/g protein) was more homogeneous and cohesive while it turned to be softer and less set.
- Compared to blank control, high protein (7%) soy set yoghurt with Galaya Enhance alone (0.52 EEU/g yoghurt fermentation base) had even worse homogeneity although the cohesiveness was increased.
- Compared to TL1 alone, a combination of TL1 (0.4 KPRU/g protein) and Galaya Enhance (0.52 EEU/g yoghurt fermentation base) further improved cohesiveness and mitigated reduced setting. Therefore, the combination of these two enzymes resulted in a set yoghurt with good setting and smoothness in the visual evaluation and highly probably a smooth and thick mouth coating due to high cohesiveness and homogeneity measured by both TA and visual evaluation.

Example 11

Effect of TL1 on High-Protein (10%) Stirred Legume-Yoghurt

In this example, yoghurts were made from protein from lentil and faba bean, to demonstrate the applicability of TL1 in high-protein yoghurts of other legume sources: Suspensions of commercial lentil and faba bean protein isolate were prepared in water to a final protein content of 10%, and 2% sunflower oil, 1% sugar and 0.045% yeast extract added. The mixture was pre-homogenized on overhead stirrer (8,000 rpm, 2 min), before high-pressure homogenization (first pass 250/50 bar, second pass 750/50 bar). After pasteurization (90° C., 10 min) and cooling, TL1 was dosed 0, 50, 100, 150, or 200 KPRU/kg protein, together with 0.4 U/L commercial starter culture (ABY-3, Chr. Hansen). Fermentation was carried out at 43° C. until pH reached 4.5, and the legume-yoghurt gels were broken using a shear mixer (Ultra Turrax, IKA, Germany) until smoothened (0-120 sec). The yoghurts were stored refrigerated until evaluation after 1 week.

Viscosity and forced syneresis test of the legume-yoghurt samples were evaluated according to protocols described in Example 1. Texture was assessed visually, according to protocol in Example 7, on 'initial stir', 'amount of stir', and 'full stir', graded 1-7, according to procedure described in Example 7. The results are summarized in Tables 24-25.

TABLE 24

| Lentil yoghurt properties after 1-week storage. | | | | | |
|---|---|---|---|---|---|
| | | | Visual appearance | | |
| Sample ID | Viscosity (cP) | Syneresis (wt %) | Initial stir | Amount of stir | Full stir |
| Reference (Lentil yoghurt 10%) | 11,219 | 18 | 1 | 3 | 3 |

TABLE 24-continued

Lentil yoghurt properties after 1-week storage.

| Sample ID | Viscosity (cP) | Syneresis (wt %) | Visual appearance | | |
|---|---|---|---|---|---|
| | | | Initial stir | Amount of stir | Full stir |
| Lentil yoghurt + TL1 (50) | 7,001 | 13 | 2 | 5 | 5 |
| Lentil yoghurt + TL1 (100) | 5,692 | 12 | 3.5 | 5.5 | 6 |
| Lentil yoghurt + TL1 (200) | 4,641 | 11 | 4 | 6 | 6 |

TABLE 25

Faba bean yoghurt properties after 1-week storage.

| Sample ID | Viscosity (cP) | Syneresis (wt %) | Visual appearance | | |
|---|---|---|---|---|---|
| | | | Initial stir | Amount of stir | Full stir |
| Reference (Faba yoghurt 10%) | 13,526 | 15 | 1 | 2 | 1.5 |
| Faba yoghurt + TL1 (50) | 10,260 | 8 | 2 | 3 | 3.5 |
| Faba yoghurt + TL1 (100) | 7,454 | 7 | 2.5 | 5 | 4.5 |
| Faba yoghurt + TL1 (200) | 5,625 | 5 | 3 | 6 | 6 |

The reference lentil- and faba bean-yoghurts prepared without enzyme had the highest viscosities, highest level of syneresis, and inferior visual textural properties, such as most grainy, incoherent, and matte.

Addition of TL1 resulted in a significant, continuous decrease in viscosities and syneresis. Further, the enzymatic treated lentil- and faba bean-yoghurts were visually more appealing, as the lumpiness disappeared and texture became smooth, shiny, and softer.

Example 12

Sensory Effect of TL1 on Pea Protein Stirred Yoghurt

Commercial pea protein isolate was dispersed in water to obtain a 5% protein content and stirred for 30 min at room temperature. 2 wt % rapeseed oil were added while high-sheer mixing (8,000 rpm, 2 min) and the sample homogenized (first pass 250/50 bar, second pass 750/50 bar). Sucrose (1 wt %) and yeast extract (0.045%) were added to aid the later fermentation. The mixtures were pasteurized (90° C. 10 min) and rapidly cooled on ice. TL1 (0 or 20 KPRU/kg pea protein) was added to the substrate along with 0.4 U/L yogurt starter culture (ABY-3) and the samples were fermented at 43° C. until pH reached below pH 4.5. Samples were stirred by high-sheer mixing, according to Example 1, and stored refrigerated until sensory evaluation 10 days later.

Sensory evaluation was performed by an internal panel consisting of 14 panelists, having some yoghurt evaluation experience and a training session prior to the evaluation. Each panelist was given anonymous samples labeled with 3-digit random code, presented in random order. Panelists were asked to rate samples on 9-point scale according to level of smoothness of texture. Afterwards, they were asked to rank the samples according to preferred texture.

14 out of 14 assessors ranked the untreated sample as the least preferred texture. The TL1 was scored significantly higher (8 points vs. 4 for untreated) with regards to smoothness.

Example 13

Synergistic Effect of TL1 and Pectin on Pea Protein Yoghurt Texture

Pea protein yoghurts with TL1, pectin, their combination, or no additives, were compared based on viscosity, water-holding capacity and visual texture: Commercial pea protein isolate was dispersed in water at a 5% protein content. Sugar (1 wt %), and yeast extract (0.045 wt %) were added to aid fermentation. The mixture was homogenized (800 bar) and pasteurized (90° C., 10 min).

TL1 was dosed 0 or 20 KPRU/kg protein, together with 0.4 U/L commercial starter culture (ABY-3). Fermentation was carried out at 43° C. until pH reached 4.5. 0% or 0.5 wt % pectin was added, and the pea-yoghurt gels were broken using a shear mixer (4,000 rpm) until smoothened (0-120 sec). The yoghurts were stored refrigerated until evaluation after 1 week.

Viscosity and forced syneresis test of the pea yoghurt samples were evaluated according to protocols described in Example 1. Texture was assessed visually by a trained laboratory personnel, scoring the samples 1-7 on the following parameters:

Coherence: how coherent the structure of the yoghurt gel is upon first turn with a spoon. Separation gives low score.

Homogeneity: how homogeneous the texture is when it has been stirred with the spoon. Presence of grains/lumps gives low score, while uniform texture gives high score Glossiness: how glossy is the surface of the yoghurt. High reflectance gives high score, while matte surface gives low score.

The results are summarized in Table 26.

TABLE 26

| Sample | Viscosity (cP) | Syneresis (wt %) | Visual appearance | | |
|---|---|---|---|---|---|
| | | | Coherence | Homo-geneity | Glossiness |
| Reference (no additive) | 2042 | 32 | 3 | 2.5 | 3 |
| TL1 | 1720 | 26 | 4 | 6 | 5.5 |
| Pectin | 2032 | 11 | 5.5 | 4.5 | 6.5 |
| TL1 & pectin | 1791 | 1 | 6.5 | 6 | 6.5 |

The results from the visual evaluation showed pectin mainly improved coherence of the yoghurt, while TL1 improves the homogeneity. By combining the pectin and the TL1, both coherence and homogeneity is ensured. Further, the water-holding capacity of the gel is far superior.

Example 14

Applicability of TL1 in Stirred, Fermented Product Based on Other Plant Milk-Analogues As will be apparent to those skilled in the art, the enzyme solutions will work on any plant base where protein is present, here exemplified by coconut milk and pea.

Commercial coconut milk comprising 1.5% protein and 17% fat was purchased from a supermarket and fortified with a commercial pea protein isolate to a final pea protein content of 9% (after dilution) and diluted with tap-water to a coconut fat content of 5%. The mixture was homogenized (800 bar) and sucrose (2 wt %), and yeast extract (0.045 wt %) (to speed up fermentation) were added before pasteurization (90° C., 10 min). After cooling, 0.4 U/L commercial starter culture (ABY-3) was added, along with TL1 dosed at 0 ('Reference') or 300 KMTU/kg pea protein. The inoculated mixture was held at 43° C., and the pH monitored during fermentation until it reached pH<4.5. The samples were stirred and analyzed after 1-week cold storage as described in Example 1, and texture assessed visually by a trained laboratory personnel, scoring the samples according to Example 13.

TABLE 27

Coconut-pea protein yogurt properties after 1-week storage.

| Sample | Viscosity (cP) | Syneresis (wt %) | Visual appearance (score 1-7) |
|---|---|---|---|
| Reference | 25,373 | 7.3 | Coherence: 2<br>Homogeneity: 1<br>Shininess: 1 |
| TL1 300 KMTU/kg p | 7,609 | 1.6 | Coherence: 6.5<br>Homogeneity: 6.5<br>Shininess: 5.5 |

RVA measurements show that TL1 has a similar lowering effect on viscosity as in the previous examples, regardless of the plant base source. A thickness compared to a Greek-style dairy product could be obtained. TL1 again decreased the level of water expelled from the yoghurts during forced syneresis test. Finally, the yoghurts pre-treated with TL1 scored better on visual parameters, being more coherent, having no grains/particulate matter, and being shinier.

The invention claimed is:

1. A process for preparing a plant-based fermented dairy alternative, the process comprising:

(a) treating a plant-based substrate having a protein content of 5-12% (w/w) with a specific endopeptidase, wherein the specific endopeptidase has a preference for cleaving before or after a non-hydrophobic amino acid, and where in the specific endopeptidase is a trypsin-like endopeptidase derived from *Fusarium oxysporum*, a lysine-specific endopeptidase derived from *Achromobacter lyticus*, or a glutamyl-specific endopeptidase derived from *Bacillus licheniformis*; and (b) fermenting the plant-based substrate by incubating with a lactic acid bacterium to produce the plant-based fermented dairy alternative;

wherein step (a) is performed before and/or during step (b);

wherein the plant-based fermented dairy alternative exhibits at least one of reduced viscosity, reduced syneresis, smoother texture, or shorter fermentation time compared to an otherwise identical method where the plant-based substrate is not treated with the specific endopeptidase.

2. The process of claim 1, wherein at least part of the plant-based substrate is obtained from legumes.

3. The process of claim 1, wherein the plant-based substrate is a soy milk or soy beverage, coconut milk, oat milk or almond milk.

4. The process of claim 2, wherein at least part of the plant-based substrate is provided as soy protein, pea protein, lentil protein and/or *faba* bean protein.

5. The process of claim 1, wherein all of the protein in the plant-based substrate is plant protein.

6. The process of claim 1, wherein the protein in the plant-based substrate constitutes at least 50% (w/w) of the protein in the plant-based fermented dairy alternative.

7. The process of claim 1, wherein the plant-based fermented dairy alternative is a spoonable plant-based fermented dairy alternative, a stirred yoghurt alternative, a set-type yoghurt alternative, a strained yoghurt alternative, a drinkable plant-based fermented dairy alternative, a drinking yoghurt alternative, or a kefir alternative.

8. The process of claim 1, wherein the specific endopeptidase is selected from the group consisting of:

(a) a polypeptide having an amino acid sequence which is at least 80% identical to any of SEQ ID NOs: 1, 13 or 14; and (b) a variant of the polypeptide of any of SEQ ID NOs: 1, 13 or 14 comprising a substitution, deletion, and/or insertion at one or more positions.

9. The process of claim 1, wherein the trypsin-like and/or the lysine-specific endopeptidase has a specificity for cleaving after Arg or Lys which is at least 100-fold higher than its specificity for cleaving after any one of Ala, Asp, Glu, Ile, Leu, Met, Phe, Tyr or Val, and/or wherein the glutamyl-specific endopeptidase has a specificity for cleaving after Glu which is at least 10-fold, at least 20-fold, or at least 50-fold higher than its specificity for cleaving after any one of Ala, Arg, Asp, Ile, Leu, Lys, Met, Phe, Tyr or Val.

10. The process of claim 1, wherein (a) the plant-based fermented dairy alternative has at least a 25% reduction in viscosity compared to a plant-based fermented dairy alternative prepared by the same process but without addition of the specific endopeptidase, where the viscosity is determined after six days storage at 4° C. by allowing a sample of the plant-based fermented dairy alternative to set for 1 hour at 4° C. followed by viscosity measurement carried out at 20° C. at 50 rpm and the viscosity value read after 70 seconds, and (b) the plant-based fermented dairy alternative expels at least 10% less liquid in a forced syneresis test compared to a plant-based fermented dairy alternative prepared by the same process but without addition of the specific endopeptidase, where the forced syneresis test is performed after six days storage at 4° C. by centrifugation of the plant-based fermented dairy alternative for 15 min at 2643×g, and where the weight of remaining solid is recorded after removal of supernatant and the amount of expelled liquid calculated using the formula: (weight of fermented dairy alternative sample−weight of solid phase)/(weight of fermented dairy alternative sample)*100%, and/or (c) the plant-based fermented dairy alternative has a more smooth texture compared to a plant-based fermented dairy alternative prepared by the same process but without addition of the specific endopeptidase, where the texture is visually evaluated after six days storage at 4° C. by placing a sample of the plant-based fermented dairy alternative on the backside of a black plastic spoon.

11. The process of claim 1, wherein the plant-based substrate is further treated with a phospholipase before, during or after step (a) and before or during step (b).

12. The process of claim 11, wherein the phospholipase is selected from the group consisting of:

(a) a polypeptide having an amino acid sequence which is at least 60% identical to SEQ ID NO: 15; and (b) a variant of the polypeptide of SEQ ID NO: 15 comprising a substitution, deletion, and/or insertion at one or more positions.

13. The process of claim 11, wherein the phospholipase is a fungal phospholipase.

14. The process of claim 1, wherein the plant-based substrate is fortified with soy milk powder, concentrated legume protein, or isolated legume protein.

15. The process of claim 11, wherein the phospholipase is a phospholipase A1 or a phospholipase A2.

* * * * *